(12) United States Patent
Cho et al.

(10) Patent No.: US 12,016,433 B2
(45) Date of Patent: Jun. 25, 2024

(54) INSOLE, USER TERMINAL AND PAIRING METHOD THEREOF

(71) Applicant: SALTED CO., LTD, Seoul (KR)

(72) Inventors: Hyung Jin Cho, Seoul (KR); Kyung Hoon Kang, Seoul (KR)

(73) Assignee: SALTED CO., LTD., Seoul (KR)

(*) Notice: Subject to any disclaimer, the term of this patent is extended or adjusted under 35 U.S.C. 154(b) by 609 days.

(21) Appl. No.: 17/257,480

(22) PCT Filed: Jul. 17, 2020

(86) PCT No.: PCT/KR2020/009466
§ 371 (c)(1),
(2) Date: Dec. 31, 2020

(87) PCT Pub. No.: WO2021/080128
PCT Pub. Date: Apr. 29, 2021

(65) Prior Publication Data
US 2021/0366249 A1      Nov. 25, 2021

(30) Foreign Application Priority Data

Oct. 22, 2019 (KR) .................. 10-2019-0131193

(51) Int. Cl.
*A43B 3/44* (2022.01)
*A43B 3/00* (2022.01)
(Continued)

(52) U.S. Cl.
CPC .................. *A43B 3/44* (2022.01); *A43B 3/00* (2013.01); *A43B 3/42* (2022.01); *A43B 3/48* (2022.01);
(Continued)

(58) Field of Classification Search
CPC ........... G08B 6/00; A43B 3/00; A43B 3/0005; A61B 3/00; A61B 5/11; A63B 71/06;
(Continued)

(56) References Cited

U.S. PATENT DOCUMENTS

2010/0076692 A1* 3/2010 Vock .................. G08G 9/00
702/19
2011/0271554 A1* 11/2011 Jazdanian ............. A43B 17/00
36/43

(Continued)

FOREIGN PATENT DOCUMENTS

| KR | 10-2012-0101776 A | 9/2012 |
| KR | 10-2017-0002742 A | 1/2017 |
| KR | 10-1863858 B1 | 6/2018 |

OTHER PUBLICATIONS

NPL Search (Jul. 6, 2023).*
(Continued)

*Primary Examiner* — Van T Trieu
(74) *Attorney, Agent, or Firm* — Studebaker & Brackett PC

(57) ABSTRACT

Provided is an insole that can check the operation of a sensor and accurately and quickly connect with a user terminal, the user terminal and a pairing method thereof. The method for pairing an insole comprises scanning an insole, in which at least one pressure sensor and tactile element are installed, providing a vibration command to the scanned insole to vibrate a tactile element of the scanned insole, and pairing the insole including the vibrating tactile element and a user terminal.

12 Claims, 25 Drawing Sheets

(51) Int. Cl.
*A43B 3/42* (2022.01)
*A43B 3/48* (2022.01)
*H04B 17/318* (2015.01)
*A43B 3/34* (2022.01)
*A43B 3/40* (2022.01)
*A63B 71/06* (2006.01)
*G08B 6/00* (2006.01)
*H04W 76/14* (2018.01)

(52) U.S. Cl.
CPC .............. *H04B 17/318* (2015.01); *A43B 3/34* (2022.01); *A43B 3/40* (2022.01); *A63B 71/0619* (2013.01); *A63B 2071/0655* (2013.01); *A63B 2220/40* (2013.01); *A63B 2220/56* (2013.01); *A63B 2220/836* (2013.01); *G08B 6/00* (2013.01); *H04W 76/14* (2018.02)

(58) Field of Classification Search
CPC ....... A63B 71/0619; H04Q 9/00; H04W 4/00; H04W 4/02; H04W 4/027; G01C 22/00; G01C 22/006
See application file for complete search history.

(56) References Cited

U.S. PATENT DOCUMENTS

| | | | | |
|---|---|---|---|---|
| 2012/0186101 | A1* | 7/2012 | Sanchez | A43B 11/00 36/43 |
| 2016/0345865 | A1* | 12/2016 | Agrawal | A61B 5/0022 |
| 2016/0366266 | A1* | 12/2016 | Chung | H04B 1/385 |
| 2018/0132560 | A1* | 5/2018 | Kim | H04Q 9/00 |
| 2020/0253320 | A1* | 8/2020 | Guard | G06F 3/011 |

OTHER PUBLICATIONS

Notice of Allowance issued in KR 10-2019-0131193; mailed by the Korean Intellectual Property Office on Nov. 30, 2020.
Office Action issued in KR 10-2019-0131193; mailed by the Korean Intellectual Property Office on Jul. 21, 2020.

* cited by examiner

FIG. 20
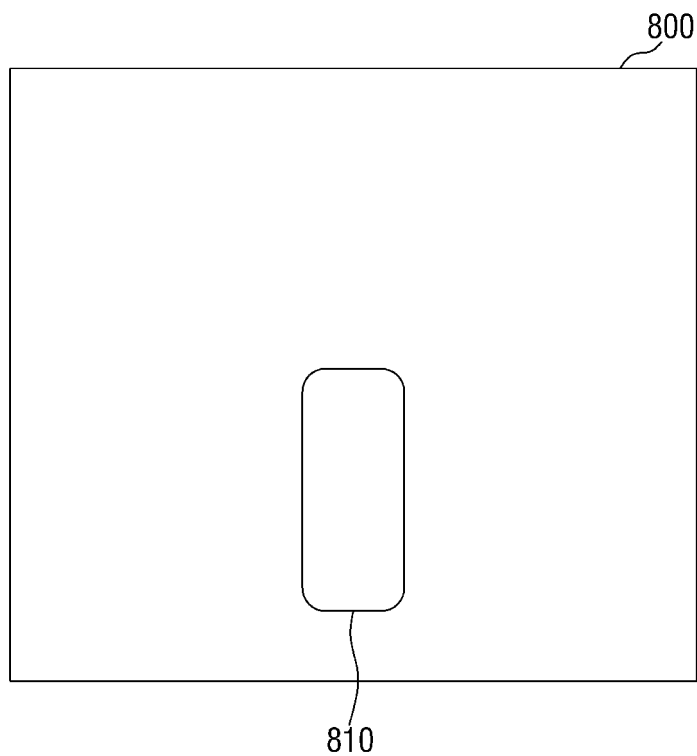
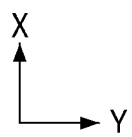

FIG. 24

| EXERCISE ANALYSIS CONTENTS | VIBRATION PATTERN |
|---|---|
| SKEWED TO LEFT | LEFT SHOE SHORTLY VIBRATE |
| SKEWED TO RIGHT | RIGHT SHOE SHORTLY VIBRATE |
| SHAKE LEFT AND RIGHT | BOTH SHOES SHORTLY VIBRATE |
| SKEWED TO REAR | BOTH SHOES INTERMITTENTLY VIBRATE AT SHORT INTERVALS FOR A CERTAIN TIME |
| SKEWED TO FRONT | BOTH SHOES INTERMITTENTLY VIBRATE AT LONG INTERVALS FOR A CERTAIN TIME |
| SHAKE BACK AND FORTH | BOTH SHOES CONTINUOUSLY VIBRATE FOR A CERTAIN TIME |

INSOLE, USER TERMINAL AND PAIRING METHOD THEREOF

CROSS-REFERENCE TO RELATED APPLICATIONS

The present application is a National Phase entry of International Patent Application No. PCT/KR2020/009466, filed on Jul. 17, 2020, which is based upon and claims the benefit of priority to Korean Patent Application No. 10-2019-0131193, filed on Oct. 22, 2019. The disclosures of the above-listed applications are hereby incorporated by reference herein in their entirety.

BACKGROUND

1. Field

The present invention relates to an insole, and more particularly, to provide a user terminal, an insole equipped with a sensing system, and a pairing method thereof.

2. Description of the Related Art

The foot is an organ that supports all the weight of the human body and is an important organ that acts as a buffer to alleviate various impacts on the body. The human foot has 52 bones, which is about a quarter of the total, and has 64 muscles, 76 joints and 214 ligaments, which are intricately intertwined so that humans can stand upright for walking or exercising. Further, the human foot is a very important organ where various nerves related to the functions of various internal organs of the human body are gathered.

Shoes are a generic term for items worn on the feet and can be used to protect and decorate the feet. Shoes are also worn in daily life and various exercises such as walking, running, golf, and baseball.

SUMMARY

Meanwhile, recently, smart shoes, in which at least one sensor is installed in shoes, are being developed.

However, it is difficult for a user of the smart shoes to check whether a sensor in the smart shoes is operating, whether a sensor is connected to a user terminal, or the like. Further, when there are a plurality of smart shoes around the user (e.g., a shoe sales store), it is difficult to determine which of the plurality of smart shoes is connected to the user terminal.

Further, the user's data may be obtained through a sensor in the smart shoes, and an analysis result may be generated using the obtained data. The user can refer to this analysis result, but it is not used for behavior correction (e.g., exercise correction, gait correction, etc.) in real time.

The problem to be solved by the present invention is to provide a method for pairing an insole capable of checking whether a sensor installed in a smart insole is operating and capable of accurately and quickly connecting to a user terminal.

Another problem to be solved by the present invention is to provide smart shoes capable of checking whether a sensor installed in a smart insole is operating and capable of accurately and quickly connecting to a user terminal.

Another problem to be solved by the present invention is to provide an exercise feedback method using a smart insole.

Another problem to be solved by the present invention is to provide a user terminal that is paired with the smart shoes.

The problems of the present invention are not limited to the problems mentioned above, and other problems that are not mentioned will be clearly understood by those skilled in the art from the following description.

One aspect of a method for pairing an insole of the present invention for achieving the above object comprises scanning an insole, in which at least one pressure sensor and tactile element are installed, providing a vibration command to the scanned insole to vibrate the tactile element of the scanned insole, and pairing an insole including the vibrating tactile element and a user terminal.

Wherein scanning the insole comprises scanning a plurality of insoles, wherein vibrating the tactile element of the scanned insole comprises providing a first vibration command to a first insole having a first signal strength, and providing a second vibration command to a second insole having a second signal strength less than the first signal strength when the first insole and the user terminal are not paired during a first time period.

Wherein the user terminal includes a vibration detection sensor, the method further comprises positioning the insole to be in contact with the user terminal, wherein the pairing comprises pairing the insole in contact with the user terminal and the user terminal by the vibration detection sensor detecting vibration of an insole in contact with the user terminal.

Wherein the vibration detection sensor is an acceleration sensor.

Wherein scanning the insole comprises scanning a left insole and a right insole, respectively, and after performing vibrating of the tactile element and pairing with respect to one of the left insole or the right insole first, performing vibrating of the tactile element and pairing with respect to the other insole.

Wherein the insole includes a lower plate, at least one pressure sensor installed on the lower plate, a control module installed on the lower plate and electrically connected to the at least one pressure sensor, the tactile element connected to the control module, and an upper plate covering the lower plate, the pressure sensor, the control module, and the tactile element.

Wherein a thickness of a rear foot area of the upper plate is thicker than a thickness of a fore foot area of the upper plate.

Wherein the control module is arranged in an arch area of the insole, and the tactile element is arranged to be biased toward the outward of a foot rather than the inward in the arch area.

One aspect of a shoe of the present invention for achieving the above object comprises an outsole, an upper structure connected to the outsole and defining a space for a foot to enter, and an insole installed in the space and arranged on the outsole, wherein the insole comprises a lower plate, at least one pressure sensor installed on the lower plate, a control module installed on the lower plate and electrically connected to the at least one pressure sensor, a tactile element connected to the control module, and an upper plate covering the lower plate, the pressure sensor, the control module and the tactile element, wherein the control module is arranged in an arch area of the insole, and the tactile element is arranged to be biased toward the outward of a foot rather than the inward in the arch area.

One aspect of an exercise feedback method using an insole of the present invention for achieving the above object comprises selecting a type of exercise to perform, receiving pressure data from an insole, in which at least one pressure sensor and tactile element are installed, while performing the selected exercise, calculating a center of gravity based on the received pressure data, comparing the calculated center of gravity and an exercise reference area corresponding to the selected exercise to provide a vibration command to the insole according to the comparison result.

Wherein the insole includes a left insole and a right insole, wherein providing a vibration command to the insole comprises providing a vibration command according to the comparison result to at least one of the left insole and the right insole.

Wherein the vibration command according to the comparison result includes a command to generate a vibration of a preset pattern.

Wherein a weight detection area capable of detecting a center of gravity by the insole is set, wherein the exercise reference area is a part of the weight detection area and includes an area set for each type of exercise.

Wherein the vibration command is determined in consideration of a time when the calculated center of gravity is located in the exercise reference area and a time when the calculated center of gravity is outside the exercise reference area while the selected exercise is in progress.

One aspect of a user terminal pairing with an insole of the present invention for achieving the above object comprises a processor for scanning an insole, in which at least one sensor and tactile element are installed, and providing a vibration command to the scanned insole to vibrate a tactile element of the scanned insole, wherein the processor includes the vibrating tactile element.

Details of other embodiments are included in the detailed description and drawings.

According to the present invention, a user can check whether a sensor installed in a smart insole is operating, and can accurately and quickly connect to a user terminal.

Further, an exercise feedback method using a smart insole may be provided.

In addition, when the user performs a specific exercise, it is possible to receive a more accurate exercise method by determining whether the exercise is being performed in a correct posture through the center of gravity of the body.

BRIEF DESCRIPTION OF THE DRAWINGS

FIG. 20 is a diagram illustrating a weight detecting area and an exercise reference area according to some embodiments of the present invention.

FIG. 24 is a diagram for describing a vibration pattern for each type of vibration command shown in FIG. 23.

DETAILED DESCRIPTION

Figure 1:
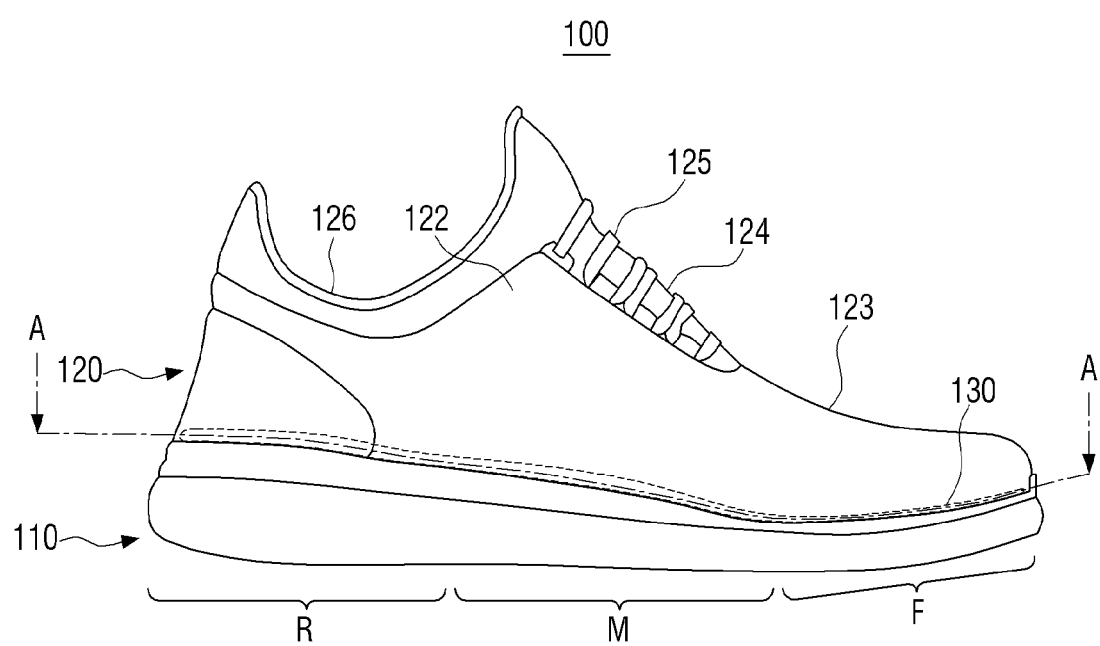
FIG. 1 is a side view for describing a shoe according to some embodiments of the present invention.

Hereinafter, preferred embodiments of the present invention will be described in detail with reference to the accompanying drawings. Advantages and features of the present invention, and methods for achieving them will be clarified with reference to embodiments described below in detail together with the accompanying drawings. However, the present invention is not limited to the embodiments disclosed below, but may be implemented in various different forms, and only the embodiments allow the publication of the present invention to be complete, and are provided to fully inform those skilled in the technical field to which the present invention pertains of the scope of the invention, and the invention is only defined by the scope of the claims. The same reference numerals refer to the same components throughout the specification.

When elements or layers are referred to as "on" or "above" of other elements or layers, it includes not only when directly above of the other elements or layers, but also other layer or other element intervened in the middle. On the other hand, when elements are referred to as "directly on" or "directly above," it indicates that no other element or layer is intervened therebetween.

The spatially relative terms "below," "beneath," "lower," "above," "upper," etc., as shown in figures, can be used to easily describe the correlation of an element or components with other elements or components. The spatially relative terms should be understood as terms including the different direction of the element in use or operation in addition to the direction shown in the drawing. For example, if the element shown in the figure is turned over, an element described as "below" or "beneath" the other element may be placed "above" the other element. Accordingly, the exemplary term "below" can include both the directions of below and above.

The element can also be oriented in other directions, so that spatially relative terms can be interpreted according to the orientation.

Although the first, second, etc. are used to describe various elements, components and/or sections, these elements, components and/or sections are not limited by these terms. These terms are only used to distinguish one element, component or section from another element, component or section. Therefore, the first element, first component or first section mentioned below may be a second element, second component or second section within the technical spirit of the present invention.

The terminology used herein is for describing the embodiments and is not intended to limit the present invention. In the present specification, the singular form also includes the plural form unless otherwise specified in the phrase. As used herein, "comprises" and/or "comprising" means that the components, steps, operations and/or elements mentioned above do not exclude the presence or additions of one or more other components, steps, operations and/or elements.

Unless otherwise defined, all terms (including technical and scientific terms) used in the present specification may be used as meanings commonly understood by those skilled in the art, to which the present invention pertains. In addition, terms defined in the commonly used dictionary are not ideally or excessively interpreted unless specifically defined.

Hereinafter, exemplary embodiments of the present invention will be described in detail with reference to the accompanying drawings, and in the description with reference to the accompanying drawings, the same or corresponding components are assigned the same reference numbers regardless of reference numerals, and the description overlapped therewith will be omitted.

Figure 2:
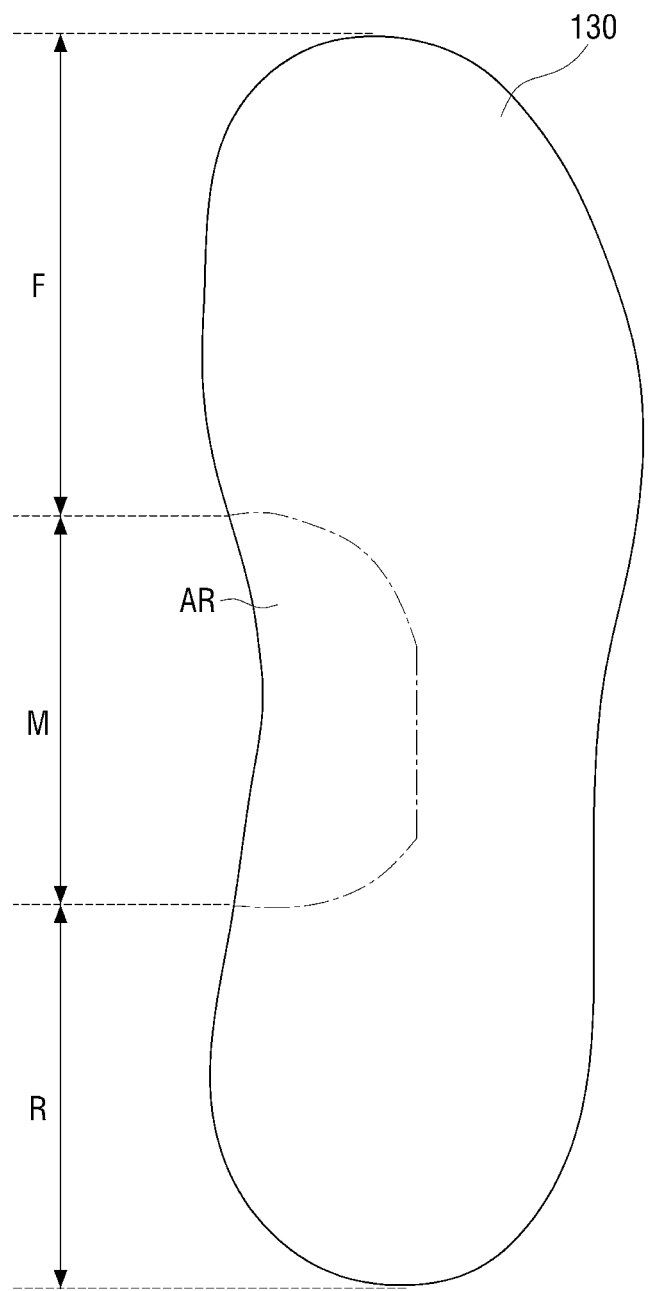
FIG. 2 is a plan view for describing the insole of FIG. 1.

FIG. 1 is a side view for describing a shoe according to some embodiments of the present invention, and FIG. 2 is a plan view for describing an insole of FIG. 1.

In FIG. 1, sport shoes are illustrated as an example, but the present invention is not limited thereto. It can be applied to various types of sport shoes such as, for example, jogging shoes (running shoes), walking shoes, tennis shoes, baseball shoes, volleyball shoes, and soccer shoes, and also applied to various types of shoes such as loafers, sneakers, straight tips, wing tips, and monk strap.

Referring to FIGS. 1 and 2, the shoes 100 includes an outsole 110, an upper structure 120, an insole 130, and the like.

The outsole 110 is located in the lower portion of the shoes 100 and refers to a portion in contact with the ground. The outsole 110 may be made of, for example, leather, rubber, or silicone, but is not limited thereto.

The upper structure 120 is connected and/or fixed to the outsole 110, and defines a space for the foot to enter. The upper structure 120 may be formed of one or more portions of, for example, leather, artificial leather, natural or synthetic fabric, polymer sheet, polymer foam material, mesh fabric, felt, non-quilted polymer, or rubber material, but is not limited thereto.

The upper structure 120 includes a side area 122, a shoe back area 123, and the like.

The side area 122 is arranged to extend along the side of the foot.

The shoe back area 123 is formed to correspond to the upper surface or the back area of the foot. Further, a space 124 having a lace 125 is formed in the shoe back area 123, and the overall dimensions of the shoes 100 can be modified using these. That is, a closing mechanism is applied so that the shoes 100 are well worn on the feet.

Further, the foot enters into the shoes 100 through the opening 126.

Meanwhile, the insole 130 is arranged on the outsole 110. The insole 130 may be in direct contact with the foot. The insole 130 may be made of, for example, leather, rubber, or silicone, but is not limited thereto.

Further, the insole 130 may include, for example, a fore foot area (F), a rear foot area (R), a mid foot area (M) arranged between the fore foot area (F) and the rear foot area (R). The ratio of the fore foot area (F), the mid foot area (M), and the rear foot area (R) may be, for example, F:M:R=40:30:30.

The arch area (AR) of the insole 130 is a part corresponding to the arch area of the foot. The arch area (AR) may be a part of the mid foot area (M), and for example, may be arranged in the inner side of the mid foot area (M) (i.e., the direction, in which the other foot is).

Figure 3:
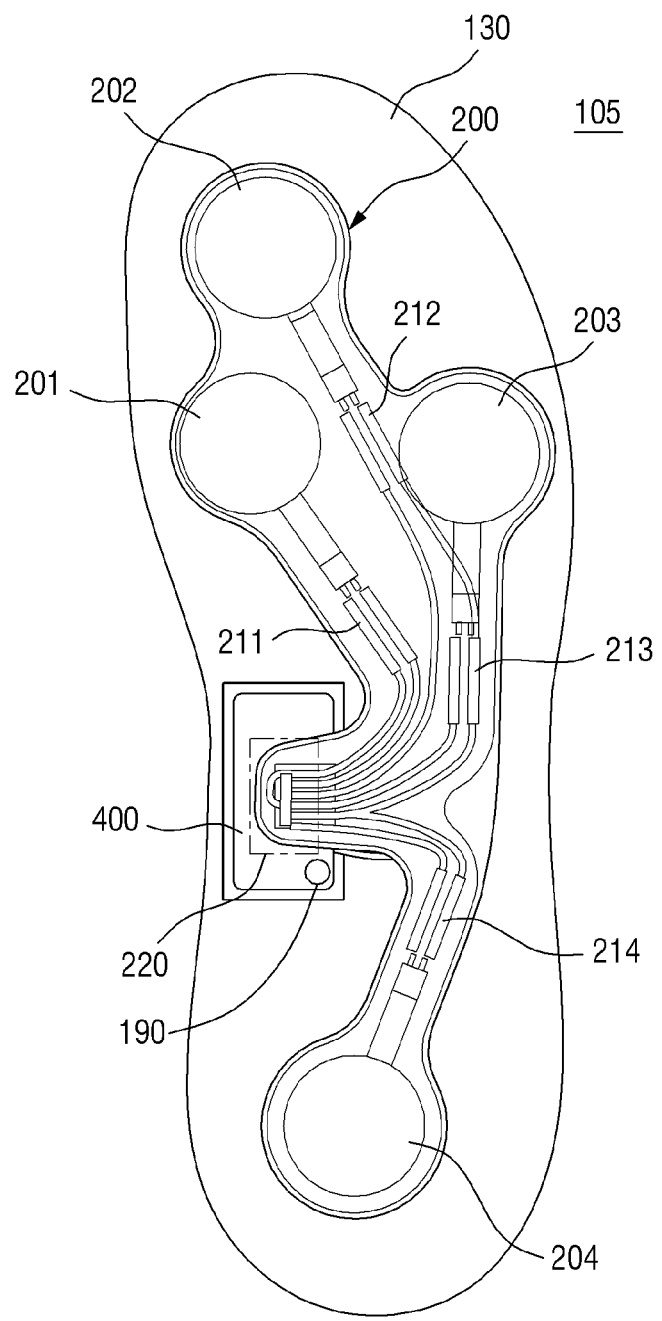
FIG. 3 is a cross-sectional view taken along line A-A of FIG. 1.

Meanwhile, a sensing system is installed in the insole 130 of the shoes according to some embodiments of the present invention (see 105 of FIG. 3). The sensing system 105 may sense pressure generated by a foot using a plurality of sensors, and communicate with an external device (i.e., a user terminal) using an antenna. The sensing system 105 may be completely embedded in the insole 130, but is not limited thereto. The insole 130 may be provided separately from the combination of the outsole 110 and the upper structure 120, and may be freely attached or detached from the combination.

Since the insole 130 includes a tactile element (for example, a vibration motor) therein, the insole 130 may deliver a tactile signal to a user. The tactile signal can be implemented in the form of vibration. Although described later in detail, the tactile signal may be used for pairing between a shoe and a user terminal, or may be used to notify the user's exercise state.

Next, the sensing system 105 will be described in detail with reference to FIGS. 3 to 7.

Figure 4:
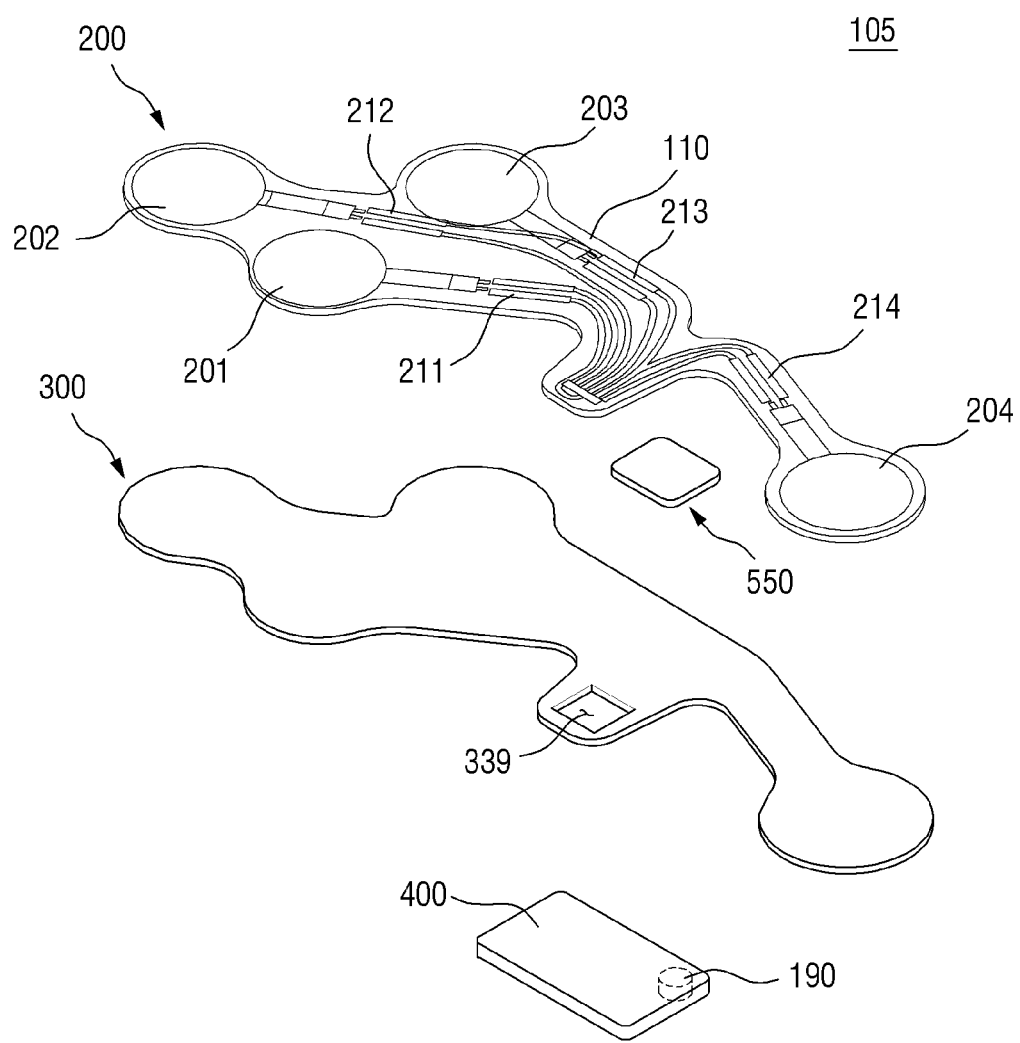
FIG. 4 is an exploded perspective view of the sensing system of FIG. 3.
Figure 5:
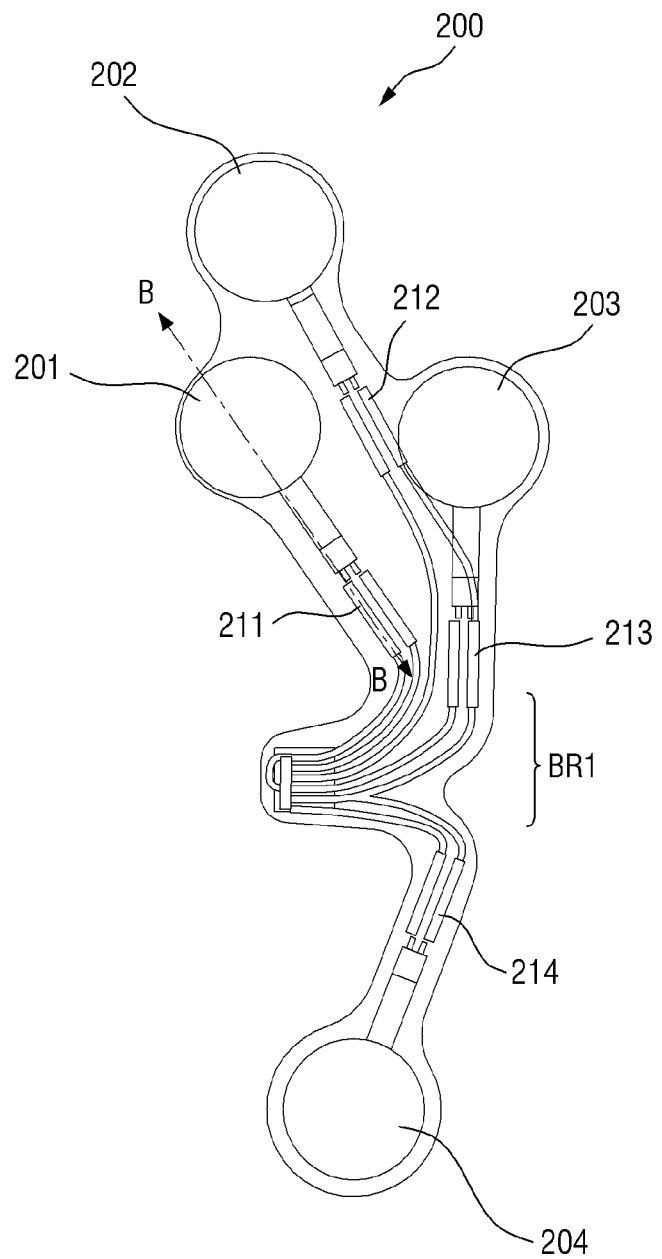
FIG. 5 is a diagram illustrating the flexible circuit board of FIG. 3.
Figure 6:
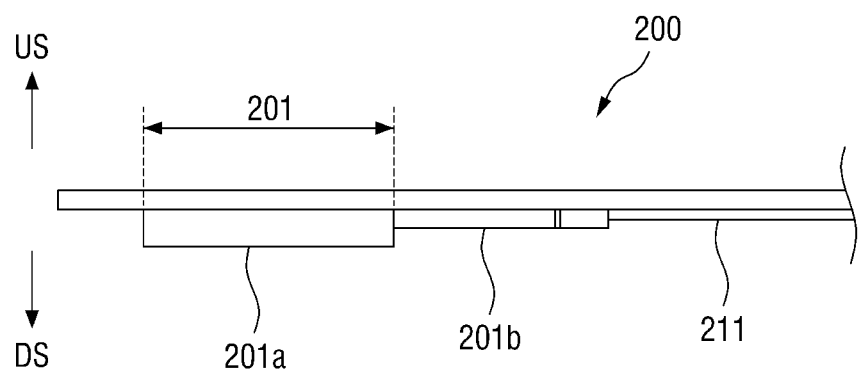
FIG. 6 is a cross-sectional view taken along line B-B of FIG. 5.
Figure 7:
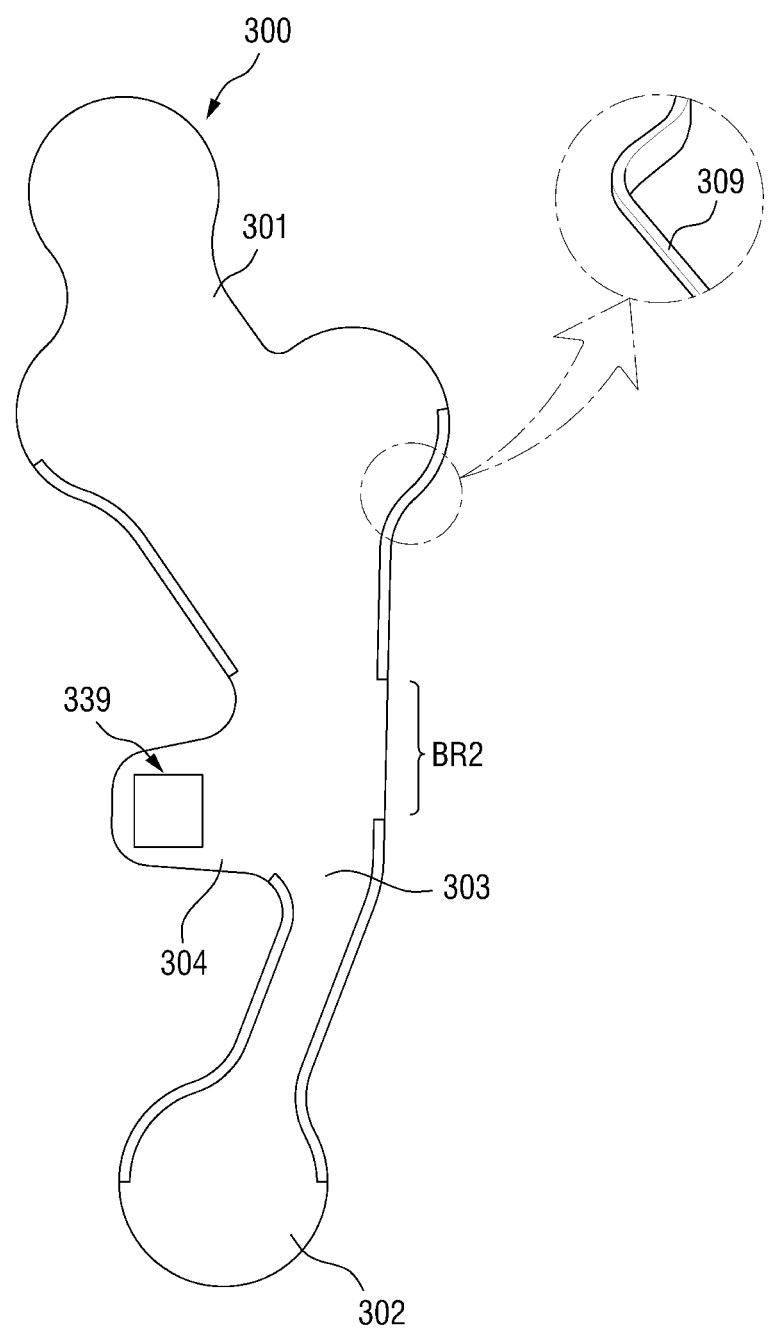
FIG. 7 is a view for describing the support plate of FIG. 3.

FIG. 3 is a cross-sectional view taken along A-A of FIG. 1, FIG. 4 is an exploded perspective view of the sensing system of FIG. 3, FIG. 5 illustrates a flexible circuit board of FIG. 3, FIG. 6 is a cross-sectional view taken along B-B of FIG. 5, and FIG. 7 is a diagram for describing the support plate of FIG. 3.

First, referring to FIGS. 3 to 5, the sensing system 105 may include a flexible circuit board 200, a binder 550, a control module 400, and the like. Further, the sensing system 105 may optionally further include a support plate 300.

The flexible circuit board 200 includes a plurality of sensing areas 201, 202, 203 and 204, in which a plurality of sensors may be installed, and wirings 211, 212, 213 and 214 connected to the plurality of sensors.

Among the sensing areas 201, 202, 203 and 204, the first sensing area 201 and the third sensing area 203 may correspond to the football of the foot, the second sensing area 202 may correspond to the big toe of the foot, and the fourth sensing area 204 may correspond to the heel of the foot. Here, the position and number of the plurality of sensing areas 201, 202, 203 and 204 may be changed according to design. For example, the number of sensing areas 201, 202, 203 and 204 may be 5 or more or 3 or less. Further, the second sensing area 202 may be arranged at the position corresponding to the second toe or the third toe instead of the big toe, or may correspond to the position corresponding to the mid foot area. Hereinafter, it will be described that one sensor 201a, 202a, 203a, 204a (see FIG. 10) is arranged in each of the sensing areas 201, 202, 203 and 204, but is not limited thereto. That is, not one sensor may be arranged in each sensing area 201, 202, 203, 204, but two or more sensors may be arranged. Further, in the shoes according to some embodiments of the present invention, the sensor may be a film-type pressure sensor. Other types of sensors may be arranged depending on the design.

The wirings 211, 212, 213 and 214 may start in the common area 220 and branch in the direction of each sensing area 201, 202, 203 and 204.

For example, the wirings 211, 212, 213 and 214 may have an inverted C shape or a right parenthesis shape (i.e., ")" shape) as shown. That is, the wirings 211, 212, 213 and 214 may be formed to start in the common area 220 and bend in the outer direction of the shoe to reach each sensing area 201, 202, 203 and 204. By having such a shape, it is possible to stably collect each of the wirings 211, 212, 213 and 214 in the common area 220 and prevent disconnection of the wirings 211, 212, 213 and 214.

Here, the wirings 211, 212, 213 and 214 may be electrically connected to the control module 400 through the common area 220.

Although described later, the common area 220 may be formed inside the arch area (AR) of the shoe.

Further, as illustrated in FIG. 6, the sensor 201a may be arranged in the lower direction (DS) of the sensing area 201. For example, the wiring 201b from the sensor 201a may be directly connected to the wiring 211 in the wiring area. These wirings 201b and 211 may also be arranged in the lower direction (DS). Here, the upper direction (US) is the direction, in which the user of the shoes 100 is located, and the lower direction (DS) is the opposite of the upper direction (US) and is the ground direction. In this way, since the wirings 201b and 211 and the sensor 201a are directed lower direction (DS) and facing the support plate 300, durability may be improved. The sensing system 105 is formed to be completely embedded in the insole 130. For example, when the wirings 201b and 211 are directed the upper direction (US), the wirings 201b and 211 comes into direct contact with the inner surface of the insole 130 due to the pressure of the foot. In this case, friction occurs between the wirings 201b and 211 and the insole 130, and thus, the wirings 201b and 211 may be easily disconnected. On the other hand, when the wirings 201b and 211 face the support plate 300, the possibility of occurring such a disconnection decreases.

Referring back to FIGS. 3, 4, and 7, the support plate 300 is arranged in the lower direction of the flexible circuit board 200. In FIG. 7, the support plate 300 is illustrated to have a shape similar to that of the flexible circuit board 200, but is not limited thereto. The support plate 300 connects the support units 301 and 302 arranged in the lower portion of the sensing areas 201, 202, 203, and 204 of the flexible circuit board 200 and the support units 301 and 302 to each other, and includes a connection unit 303 arranged in the lower portion of the wirings 211, 212, 213, and 214 of the flexible circuit board 200. Further, the flexible circuit board 200 may further include a branch unit 304 formed to extend from the connection unit 303 in a direction, in which the control module 400 is installed. However, the shape of the support plate 300 may be any shape as long as it can perform the functions mentioned below.

First, the support plate 300 serves to increase the sensing sensitivity of a sensor (e.g., 201a) installed in the flexible circuit board 200.

When the user walks, runs, or exercises, the user's feet step on the sensor 201a (film-type pressure sensor). However, since the sensor 201a is embedded in the insole 130, if there is no support plate 300, the sensor 201a directly presses the insole 130 when the user's foot steps on the sensor 201a. In general, the insole 130 is formed of a soft material (e.g., rubber, silicone) that can prevent impact. Accordingly, the sensor 201a meets the fluffy material of the insole 130, and the sensing sensitivity of the sensor 201a is deteriorated. Accordingly, a support plate 300 made of a material having a strength higher than that of the insole 130 is installed in the lower portion of the sensing areas 201, 202, 203, 204 of the flexible circuit board 200. Therefore, when the user's foot presses the sensor 201a, the sensor 201a directly contacts the support plate 300, not a fluffy material. Therefore, it is possible to increase the sensing sensitivity of the sensor 201a.

On the other hand, if the upper surface of the outsole 110 that the lower surface of the insole 130 contacts with is made of a material of relatively high strength and can serve as the support plate 300, the support plate 300 may be omitted. Hereinafter, it will be described mainly on that the support plate 300 is provided.

The support plate 300 may have a strength higher than that of the flexible circuit board 200. Further, the support plate 300 may hold the position of the flexible circuit board 200.

Since the flexible circuit board 200 is a soft material that can bend and the sensing system 105 is embedded in the insole 130, the flexible circuit board 200 cannot be placed in the proper position within the insole 130. Further, it is not easy to know from the outside whether or not it is placed in the proper position.

Meanwhile, the support plate 300 includes a protrusion 309 so that the flexible circuit board 200 can be easily positioned.

The protrusion 309 may extend in an upper direction (i.e., a direction in which the flexible circuit board is located). The position of the flexible circuit board 200 may be fixed by the protrusion 309.

The protrusion 309 may be formed along the contour of the support plate 300, but is not limited thereto. It may be formed on the entire contour of the support plate 300 or may be formed only on a part of the contour. For example, as shown in FIG. 7, the protrusion 309 may be formed at a portion where the support unit 301 and the connection unit 303 are connected. The support unit 301 or 302 may be relatively wide along the shape of the flexible circuit board 200, and the connection unit 303 may be relatively narrow in consideration of an area, in which the control module 400 is to be formed. That is, the width of the support unit 301 is wider than the width of the connection unit 303. Alternatively, the width of the support unit 302 is wider than the width of the connection unit 303. Therefore, as shown in FIG. 7, since the protrusion 309 is formed at a portion where the support unit 301 and the connection unit 303 are connected to each other, or a portion where the support unit 302 and the connection unit 303 are connected to each other, even though the protrusion 309 is formed in a non-wide area, it may be easy to fix the position of the flexible circuit board 200.

Further, the branch unit 304 is formed to extend from the connection unit 303 of the support plate 300 in a direction, in which the control module 400 is installed. The branch unit 304 may be arranged on the control module 400 to prevent damage to the control module 400 from unexpected external strong impacts.

A through hole 339 may be formed in the branch unit 304 of the support plate 300. The control module 400 and the flexible circuit board 200 may be electrically connected to each other through the through hole 339. That is, the common area 220, in which the wirings 211, 212, 213, and 214 of the flexible circuit board 200 are gathered, may be arranged to correspond to the through hole 339.

Meanwhile, depending on the design, the branch unit 304 of the flexible circuit board 200 may be omitted. In this case, there may be no other components between the flexible circuit board 200 and the control module 400, and thus, the flexible circuit board 200 and the control module 400 may be electrically connected to each other.

The binder 550 serves to connect the flexible circuit board 200 and the support plate 300 to each other. As the binder 550, for example, various types of adhesives may be used. For example, solvent adhesives, pressure sensitive adhesives, heat sensitive adhesives, reactive adhesives, etc. may be used, but the present invention is not limited thereto.

Referring back to FIG. 4, the binder 550 may be formed, for example, on at least a part of the connection unit 303 of the support plate 300. That is, the binder 550 may not fix the entire flexible circuit board 200 and the support plate 300.

Specifically, the gait phase of the user can be largely divided into a stance phase and a swing phase. Here, the stance phase refers to a period when the foot is in contact with the ground, and the swing phase refers to a period when the foot is away from the ground. Again, the stance phase may be performed in the order of an initial contact, a loading response, a mid stance, and a terminal stance. In addition, the swing phase may be performed in the order of pre-swing and swing.

Initial contact and loading response require weight acceptance, mid stance and terminal stance require single limb support, pre-swing and swing require stretching foot forward and moving the weight forward (swing limb advancement).

Meanwhile, in the terminal stance phase, sensors arranged in the first and third sensing areas 201 and 203 (that is, sensors arranged in positions corresponding to the football) may be pressed, and then, in the pre-swing phase, only a sensor arranged in the sensing area 202 (i.e., a sensor arranged in a position corresponding to the big toe) can be pressed. During the user's gait, the first and second sensing areas 201 and 203 may be bent in a process of being connected to the pre-swing from the terminal stance.

Here, referring to FIGS. 4 and 7, the binder 550 may be formed on at least a part of the connection unit 303 of the support plate 300. That is, the binder 550 may be formed between the first and third sensing areas 201 and 203 and the fourth sensing area 204. Alternatively, the binder 550 may not be formed in the sensing areas 201, 203 and 204, but may be formed only in at least a portion of the connection unit 303. Alternatively, the binder 550 may be formed in a part of the connection unit 303 close to the branch unit 304 (see BR2 of FIG. 7).

Since the support plate 300 and the flexible circuit board 200 are connected (attached) in this way, in the process of being connected to the pre-swing from the terminal stance, even though the flexible circuit board 200 is bent, the support plate 300 is only slightly bent. Therefore, in this process, the flexible circuit board 200 and the support plate 300 are slightly separated. That is, a slight lifting of the flexible circuit board 200 may occur.

Accordingly, even if the support plate 300 has a higher strength than the flexible circuit board 200, durability of the flexible circuit board 200 and the support plate 300 can be secured in the user's gait phase.

Figure 8:
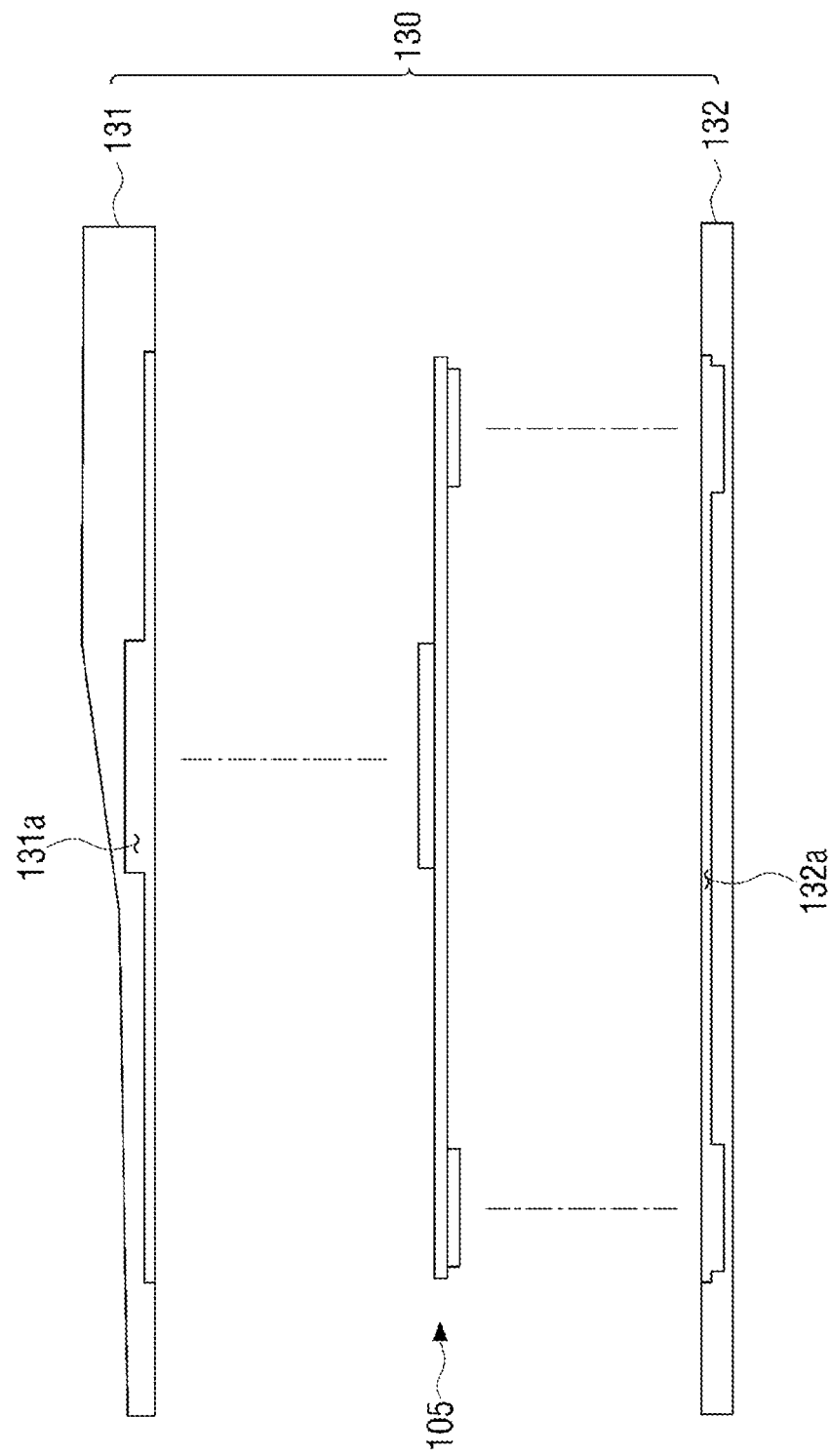
FIGS. 8 and 9A are diagrams for describing a coupling relationship between the insole shown in FIG. 1 and the sensing system shown in FIG. 3.
Figure 9A:
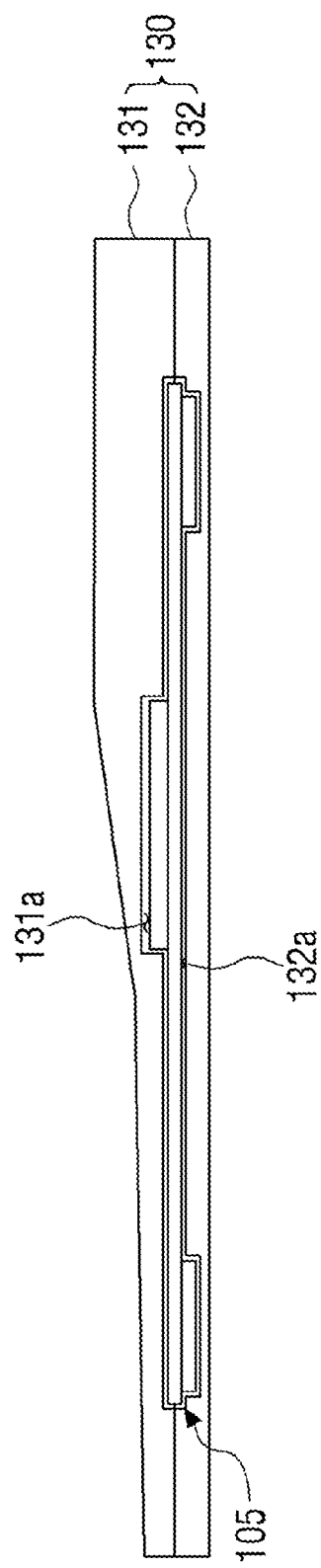

FIGS. 8 and 9A are diagrams for describing a coupling relationship between the insole shown in FIG. 1 and the sensing system shown in FIG. 3.

Referring to FIGS. 8 and 9A, the insole 130 may include an upper plate 131 and a lower plate 132.

A sensing system 105 may be provided between the upper plate 131 and the lower plate 132. The upper plate 131 and the lower plate 132 may be provided with receiving grooves 131a, 132a. The receiving grooves 131a and 132a may be formed according to the protruding shape of the sensing system 105. For example, the receiving groove 131a of the upper plate 131 is formed to correspond to the protruding shape of the control module 400 of the sensing system 105, and the receiving groove 132a of the lower plate 132 may be formed to correspond to the protruding shape of sensors 201a, 202a, 203a, 204a.

When the upper plate 131 and the lower plate 132 are coupled to each other, the sensors 201a, 202a, 203a, 204a of the sensing system 105 and the control module 400 are accommodated in the receiving grooves 131a, 132a, and the sensing system 105 can be stably embedded in the insole 130.

The lower plate 132 may be provided in the shape of a flat plate as a whole. The control module 400 is arranged in the arch area (AR) of the insole 130 (see FIG. 2), and a part of the upper plate 131 corresponding to the area, in which the control module 400 is arranged, may be formed thicker than other parts. Due to this, a feeling of foreign body caused by the control module 400 may be prevented.

Further, in the upper plate 131, a thickness of the rear foot area may be thicker than that of the fore foot area. In general, the user's load acting on the insole 130 may be larger in the rear side of the insole 130 compared to its front side. As the thickness of the rear foot area is formed thicker than the fore foot area of the upper plate 131, a similar pressure can be applied to the sensor arranged in the fore foot area of the insole 130 and the sensor arranged in the rear foot area.

Alternatively, a sensor arranged in the fore foot area of the insole 130 and a sensor arranged in the rear foot area may have different pressure detection ranges. For example, a sensor arranged in the rear foot area of the insole 130 may detect pressure less sensitively than a sensor arranged in the fore foot area of the insole 130. For this reason, even if a large load is applied to the rear foot area compared to the fore foot area of the insole 130, each sensor can detect a pressure of a similar size.

Further, the lower plate 132 may be made of a material having a higher strength than the upper plate 131. The upper plate 131 is made of a relatively soft material because it directly contacts the user's feet, and the lower plate 132 may be made of a relatively hard material to increase the sensing sensitivity of the sensors 201a, 202a, 203a, 204a. In this case, the support plate 300 may be omitted. When receiving pressure by the user's feet, the sensors 201a, 202a, 203a, and 204a can sense sensitively while contacting the lower plate 132 made of a hard material.

Figure 9B:
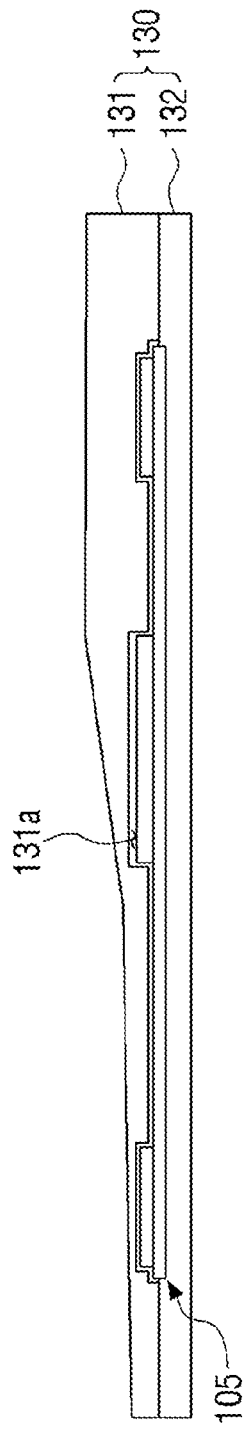
FIG. 9B is a diagram for describing a shape, in which a sensing system is coupled into an insole according to another embodiment of the present invention.

FIG. 9B is a diagram for describing a shape, in which a sensing system is coupled into an insole, according to another embodiment of the present invention.

Figure 10:
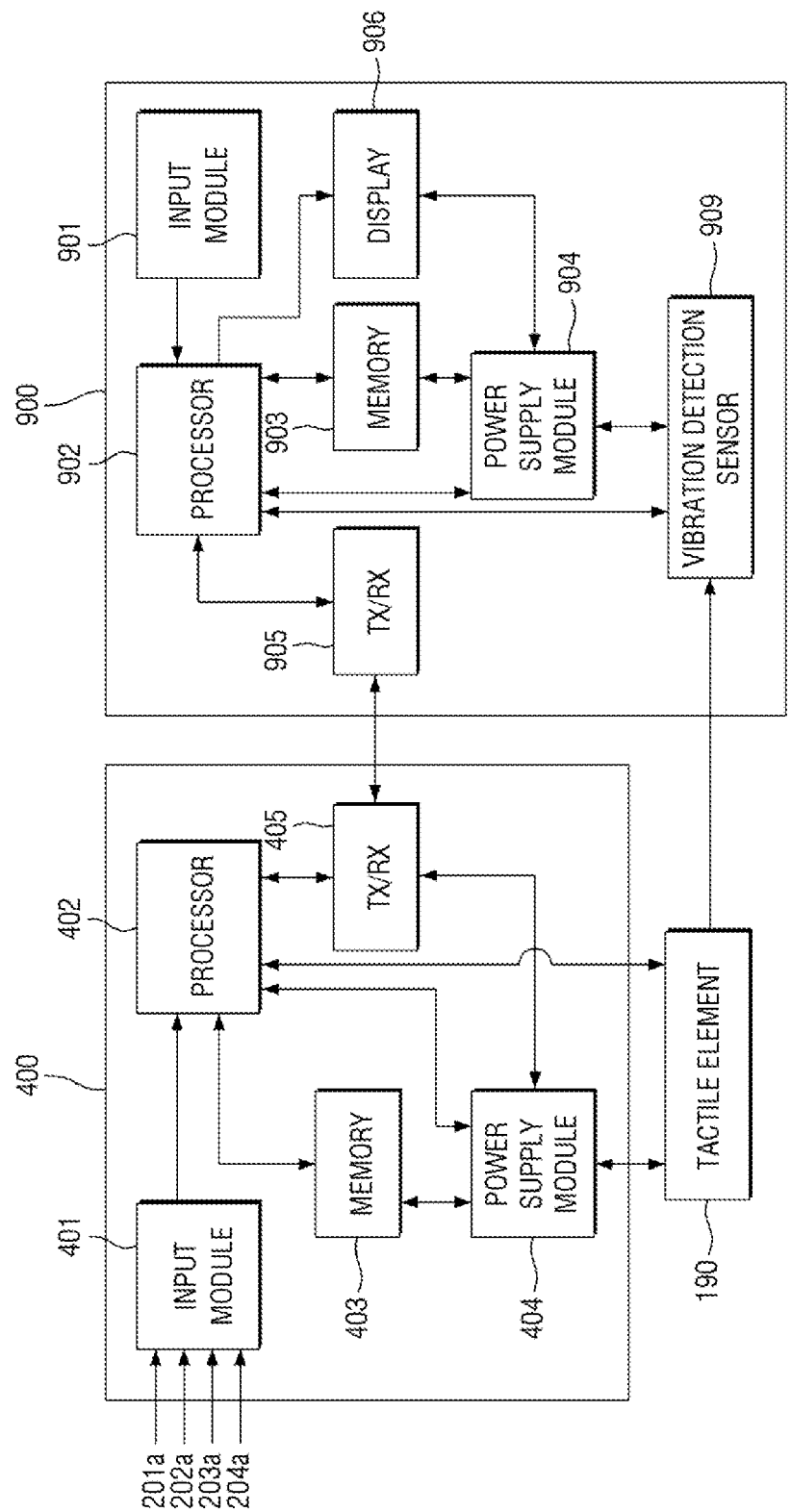
FIG. 10 is a diagram for describing a relationship between an insole and a user terminal according to some embodiments of the present invention.

Referring to FIG. 9B, in the sensing system 105, the sensors 201a, 202a, 203a, 204a and the control module 400 may all face the upper direction (i.e., see US in FIG. 6). In this case, the lower plate 132 has a generally flat shape, and a receiving groove 131a, in which the sensors 201a, 202a, 203a, 204a and the control module 400 may be embedded, may be formed in the upper plate 131. FIG. 10 is a diagram for describing a relationship between an insole and a user terminal according to some embodiments of the present invention. The configuration of the insole (control module 400) shown in FIG. 10 and the configuration of the user terminal are exemplary, and are not limited thereto.

Referring to FIG. 10, the control module 400 may include an input module 401, a processor 402, a memory 403, a power supply module 404, a transmission/reception module 405, and the like. Each module inside may be individually housed (i.e., in the form of a single chip), or several may be housed in one (i.e., in the form of a composite chip).

The input module 401 receives a plurality of sensing signals provided by the plurality of sensors 201a to 204a. As described above, the plurality of sensors 201a to 204a may be film-type pressure sensors.

The processor 402 processes a plurality of input sensing signals. For example, the processor 402 may convert to a data format suitable for storing in the memory 403 or may match a measurement time and a sensing signal. The processor 402 controls the memory 403, the power supply module 404, and the transmission/reception module 405.

The memory 403 may store a plurality of sensing signals according to time or may store signals processed by the processor 402.

The power supply module 404 may provide power to the processor 402, the memory 403, the transmission/reception module 405, and the like. Various types of primary and secondary batteries may be used as the power supply module 404. Lead, nickel-cadmium, nickel-hydrogen, lithium-ion, lithium polymer batteries, and the like may be used as the secondary battery, but are not limited thereto. Alternatively, the power supply module 404 may include a module that generates power using a piezoelectric sensor (e.g., a piezo sensor) or the like.

Unlike shown, an additional sensor (not shown) may be installed in the insole 130. For example, additional sensors may sense pedometer speed and/or distance information, other speed and/or distance data sensor information, temperature, altitude, atmospheric pressure, humidity, GPS data, accelerometer output or data, heart rate, pulse, blood pressure, body temperature, EKG data, EEG data, angular orientation (gyroscope-based sensor, etc.), and data related to angular orientation change, etc. Alternatively, additional sensors may sense data or information about a wide variety of other types of parameters, such as physical or physiological data related to the use of the footwear product or the user.

The control module 400 may communicate sensing signals or processed data with the user terminal 900 through the transmission/reception module 405.

Meanwhile, the tactile element 190 can operate by receiving power from the power supply module 404 and is controlled by the processor 402. The tactile element 190 may be, for example, a vibration element (e.g., a vibration motor) that generates vibration. The tactile element 190 may be individually housed from the control module 400 (i.e., in the form of a single chip), or the tactile element 190 may be housed with a module (i.e., at least one of 401, 402, 403, 404, 405) constituting the control module 400 (that is, in the form of a composite chip).

The tactile element 190 may be arranged in the arch area (AR) of the insole 130. Further, the tactile element 190 may be arranged to be biased toward the foot blade (outward) within the arch area (AR). Since it is arranged in the arch area (AR), the sense of foreign body of the tactile element 190 is prevented, and since it is arranged to be biased toward the foot blade of the arch area (AR), vibration of the tactile element 190 can be effectively delivered to the user's foot.

The user terminal 900 is a computing system (e.g., a desktop, a smart phone, a tap, a pad, etc.) that a user can use, and is not limited to a type. The user terminal 900 may include an input module 901, a processor 902, a memory 903, a power supply module 904, a transmission/reception module 905, a display 906, a vibration detection sensor 909, and the like.

The input module 901 may receive instructions/data from a user.

The transmission/reception module 905 may receive a sensing signal or processed data from the insole 130. Further, signals/data may be provided from components other than the insole 130.

The processor 902 processes signals/data provided from the transmission/reception module 901. For example, according to time, a sensing signal and a video signal (e.g., a video signal obtained by measuring an exercise (motion) performed by wearing a shoe with a camera) may be matched with each other. Further, the processor 402 controls the memory 903, the power supply module 904, the transmission/reception module 905, the display 906, and the like.

The memory 903 stores signals/data provided by the processor 902.

The power supply module 904 supplies power to the processor 902, the memory 903, the display 906, and the like.

The display 906 shows the signal/data generated by the processor 902 to the outside.

The vibration detection sensor 909 may be any module capable of recognizing the vibration of the tactile element 190 installed in the insole 130. For example, the vibration detection sensor 909 may be an acceleration sensor, but is not limited thereto. The vibration detection sensor 909 may operate under the control of the processor 902 and receive power from the power supply module 904. When vibration is detected by the vibration detection sensor 909, the user terminal 900 may be paired with the insole 130 that generated the vibration.

Figure 11:
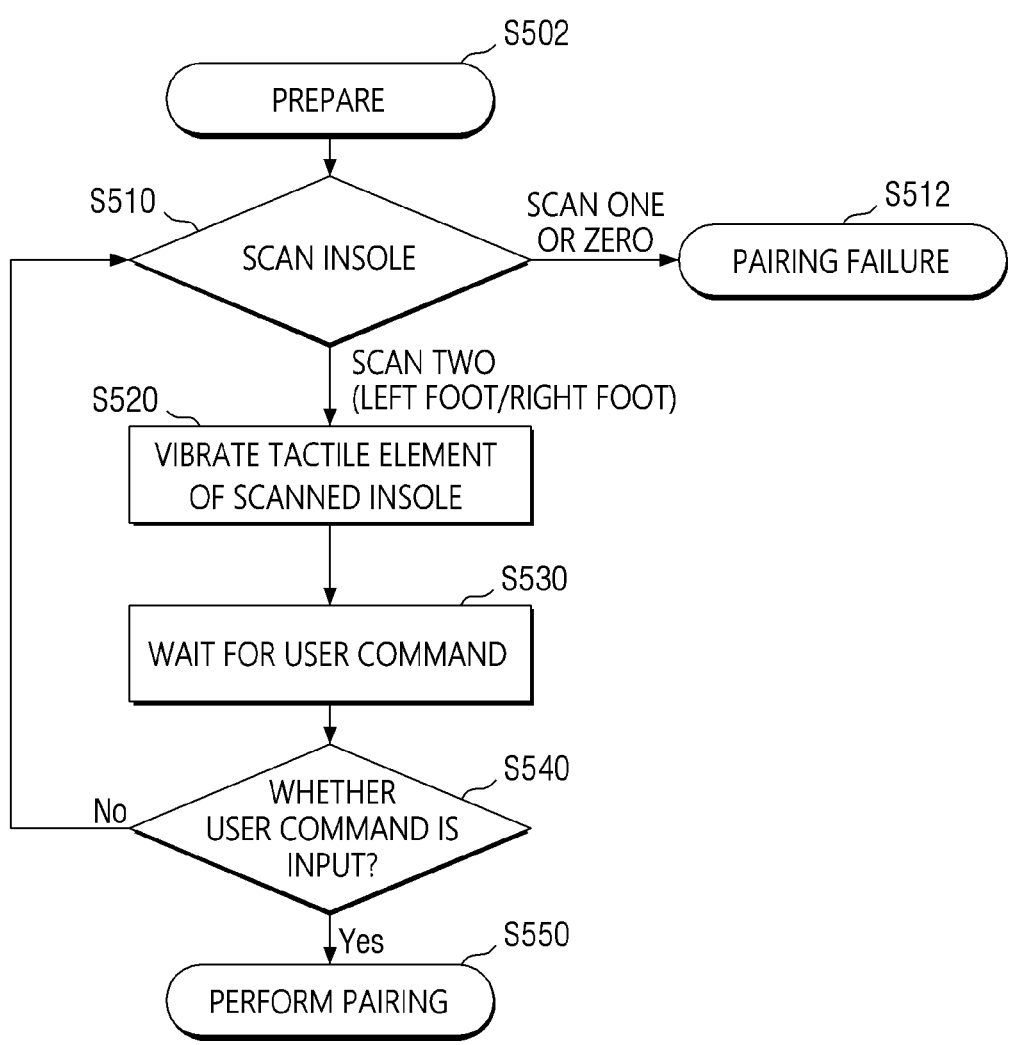
FIG. 11 is a flowchart for describing a method for pairing an insole according to an embodiment of the present invention.
Figure 12:
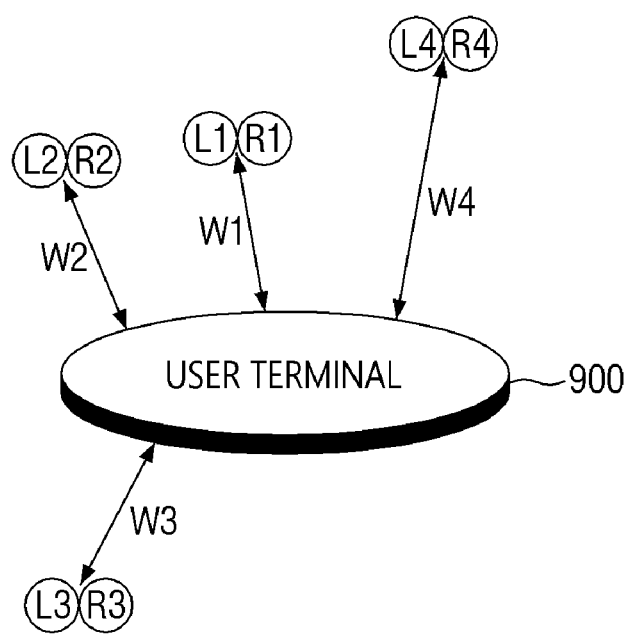
FIG. 12 is a conceptual diagram for describing a method for pairing an insole and a user terminal shown in FIG. 11.

FIG. 11 is a flow chart for describing a method for pairing an insole according to an embodiment of the present invention, FIG. 12 is a conceptual diagram for describing a method for pairing an insole and a user terminal shown in FIG. 11, and FIGS. 13 to 15 are examples of user interfaces (UIs) for describing a method for pairing an insole according to an embodiment of the present invention.

Figure 13:
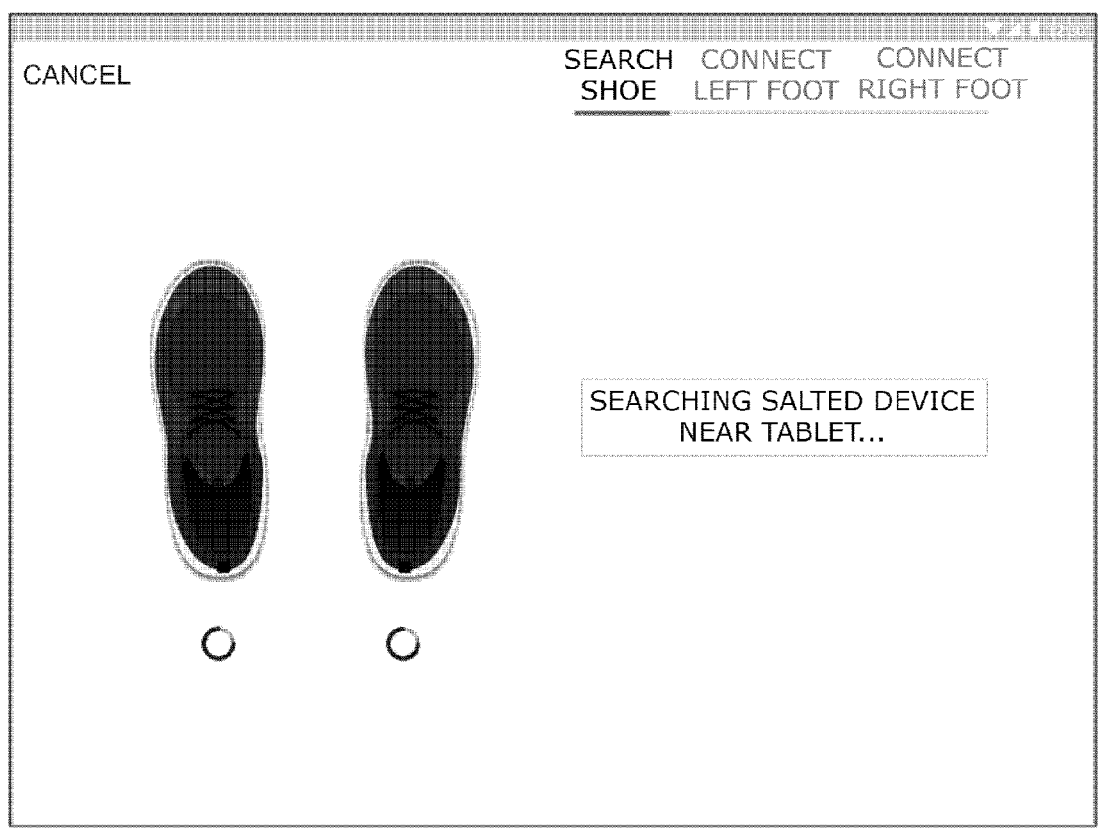
FIGS. 13 to 15 are examples of user interfaces (UIs) for describing a method for pairing an insole according to an embodiment of the present invention.

First, referring to FIGS. 11 and 13, the user terminal 900 prepares for pairing (S502). The screen shown in FIG. 13 shows a pairing start screen.

Subsequently, the user terminal 900 scans an insole, in which at least one sensor (i.e., including the sensing system 105) and a tactile element 190 are installed, in the vicinity (S510).

As a result of the scan, when only 0 or 1 insole (e.g., left insole) is scanned, it is considered that pairing has failed (S512).

As a result of the scan, a plurality of insoles (L1, L2, L3, L4, R1, R2, R3, R4) may be scanned. For example, as shown in FIG. 12, a first insole (L1, R1), a second insole (L2, R2), a third insole (L3, R3), and a fourth insole (L4, R4) may be located around the user terminal 900 at the first distance (W1), the second distance (W2), the third distance (W3), and the fourth distance (W4), respectively. Here, it may be W1<W2<W3<W4.

Each of the left and right ones of the scanned insoles is aligned in order of distance. That is, since W1<W2<W3<W4, the left insoles may be aligned in the order of L1, L2, L3, L4, and the right insoles may be aligned in the order of R1, R2, R3, R4.

In other words, the user terminal 900 aligns each of the left and right ones of the scanned insoles in the order of signal strength. The signal strength of the nearest insoles (L1 and R1) may be the strongest, and the signal strength of the farthest insoles (L4 and R4) may be the weakest.

Subsequently, the processor 902 of the user terminal 900 instructs to sequentially vibrate from the tactile element 190 of the insole having a close distance (S520). Here, before the initial vibration instruction is transmitted, the user may be in a state of wearing a shoe equipped with his or her insole.

Subsequently, the user terminal 900 waits for a user command (S530).

Specifically, according to the instruction of the user terminal 900, while a plurality of insoles sequentially vibrate in the order of distance (or according to signal strength), the insole of a shoe worn by the user may vibrate. The user who recognizes the vibration can know that the insole currently vibrating is the insole to be paired. The user who recognizes the vibration inputs a user command to the user terminal 900, which may be a command to perform pairing with the insole currently vibrating as a pairing target. An example of a user command input method will be described later with reference to FIGS. 14 and 15.

Subsequently, the user terminal 900 determines whether a user command is input (S540), and when the input of the user command is detected, performs pairing with the corresponding insole (S550).

Meanwhile, the pairing process between the user terminal 900 and the insole may be individually performed for the left insole and the right insole.

Specifically, the tactile element 190 of the nearest left insole (L1) vibrates for, for example, 5 seconds, and it is checked whether the left insole (L1) is an insole to be paired (i.e., checks whether a user command is input). If it is not paired with the left insole (L1), the tactile element 190 of the second closest left insole (L2) vibrates for, for example, 5 seconds, and it is checked whether the left insole (L2) is an insole to be paired (i.e. checks whether a user command is input). In this way, until pairing is established, a check operation is sequentially attempted for all the scanned left insoles (L1, L2, L3, L4). If the insole to be paired is not found even though the check operation is attempted for all left insoles (L1, L2, L3, L4), the scan operation is performed again.

Figure 14:
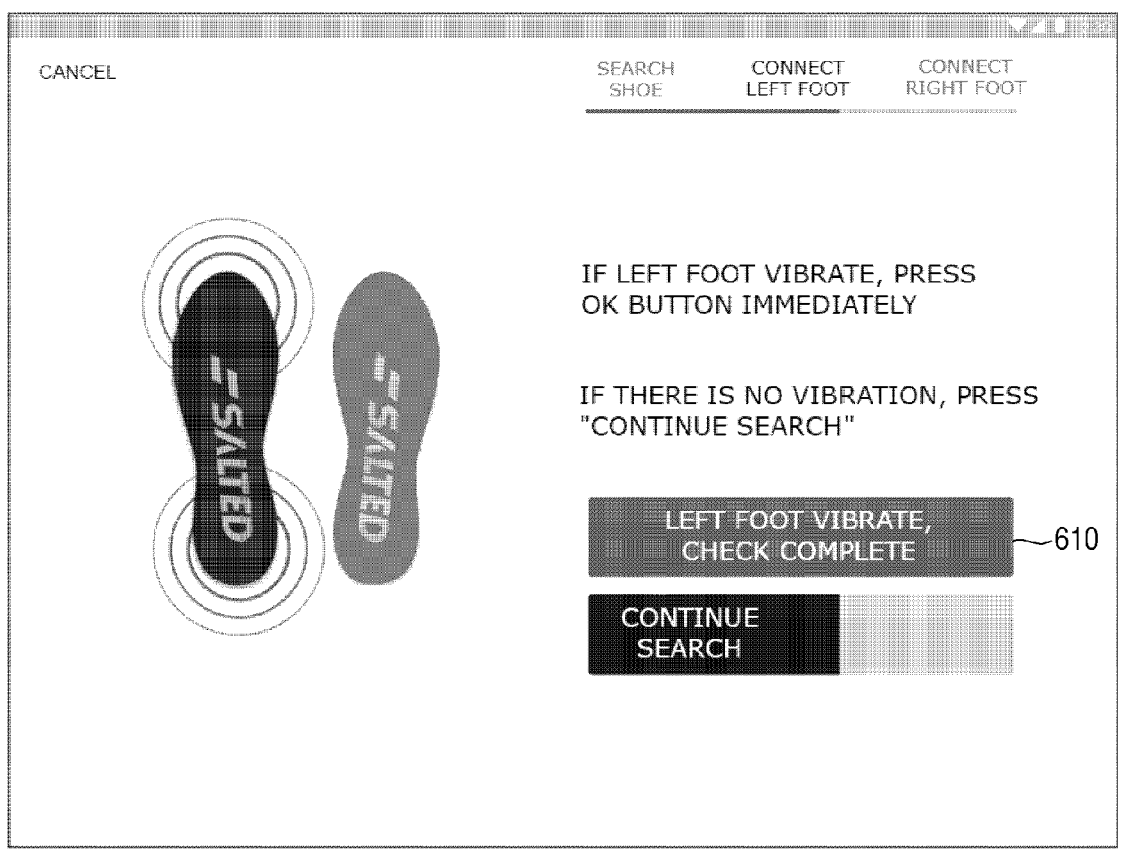

Referring to FIG. 14, the user terminal 900 may perform a check operation for the left insoles (e.g., L1, L2, L3, L4). At this time, the user may select the "confirmation complete" button 610 on the screen when the left insole (e.g., L2) worn by the user vibrates. Accordingly, the user terminal 900 may perform pairing with the left insole (L2). When the above-described check operation for the left insoles (L1, L2, L3, L4) is completed, the check operation that has been performed for the left insoles (L1, L2, L3, L4) proceeds the same for the right insoles (R1, R2, R3, R4).

Figure 15:
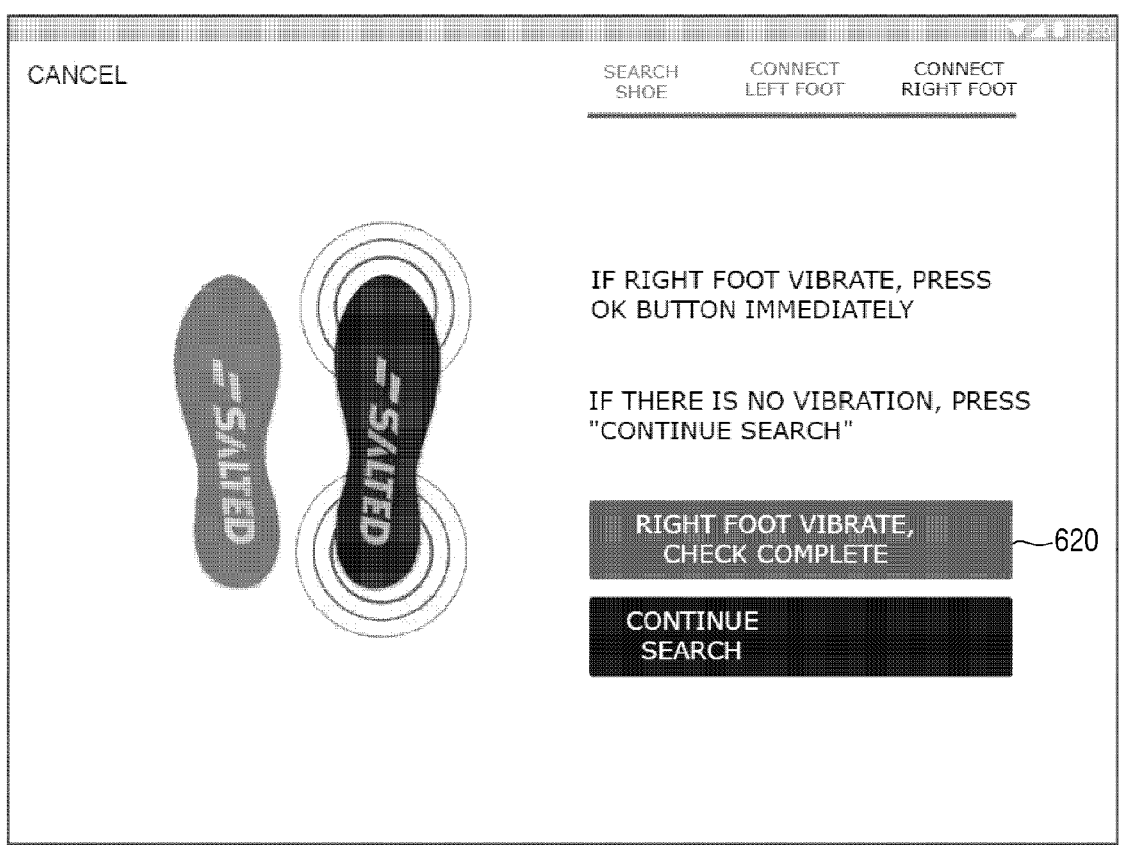

Referring to FIG. 15, the user terminal 900 may perform a check operation for the right insoles (R1, R2, R3, R4). At this time, the user may select the "confirmation complete" button 620 on the screen when the right insole (for example, R2) worn by the user vibrates. Accordingly, pairing between the user terminal 900 and the right insole may be performed.

In summary, the tactile element 190 of the insole (L1) located at the first distance (W1) from the user terminal 900 (or having the first signal strength) vibrates for a preset time (e.g., 5 seconds), and it is checked whether the insole (L1) located at the first distance W1 is the insole to be paired during the first time period (i.e., waits for a user command during the first time period). If the pairing between the insole (L1) and the user terminal 900 is not established during the first time period, the tactile element of the insole L2 located at the second distance (W2) farther than the first distance (W1) from the user terminal 900 (or having the second signal strength) may vibrate for a preset time (e.g., 5 seconds). During the second time period, it is checked whether the insole (L2) located at the second distance (W2) is the insole to be paired (i.e., waits for a user command during the second time period). The first time period and the second time period may be the same or different. This process can be repeated/performed for all insoles.

Figure 16:
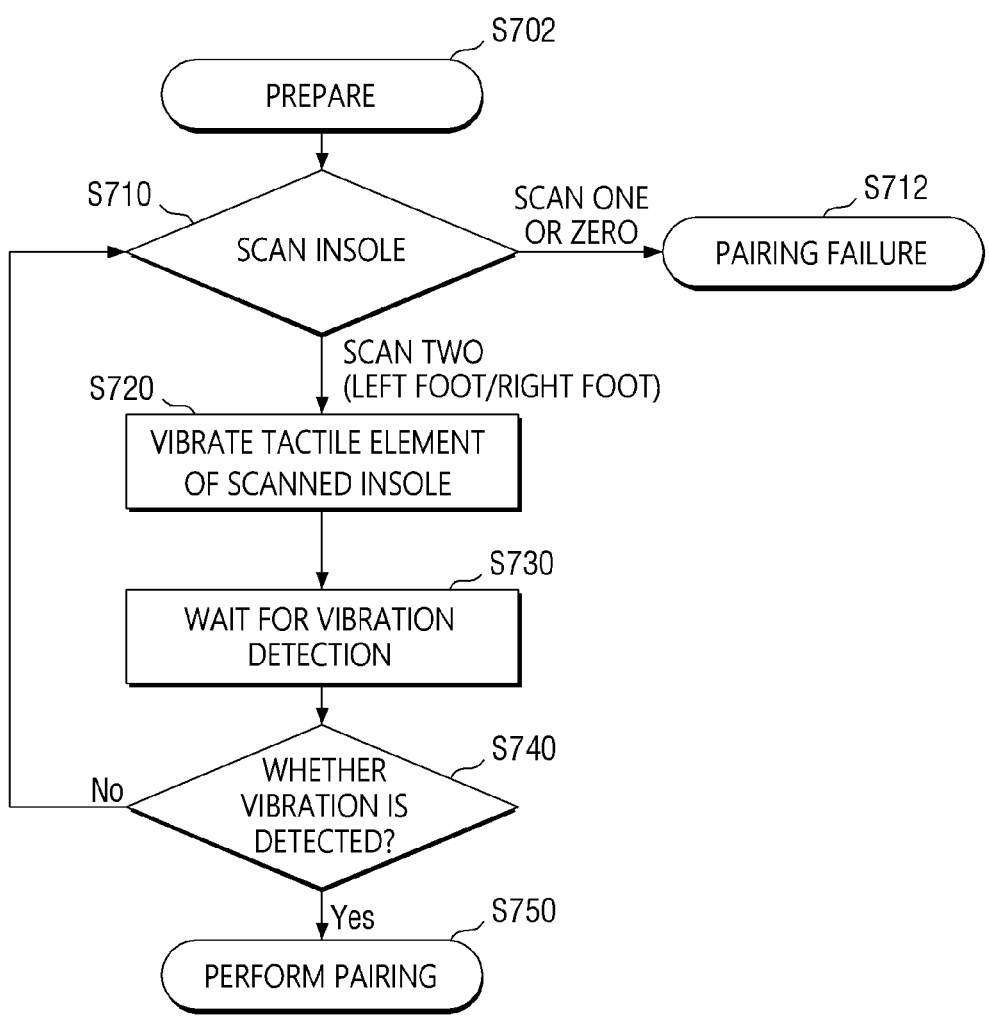
FIG. 16 is a flowchart for describing a method for pairing an insole according to another embodiment of the present invention.
Figure 18:
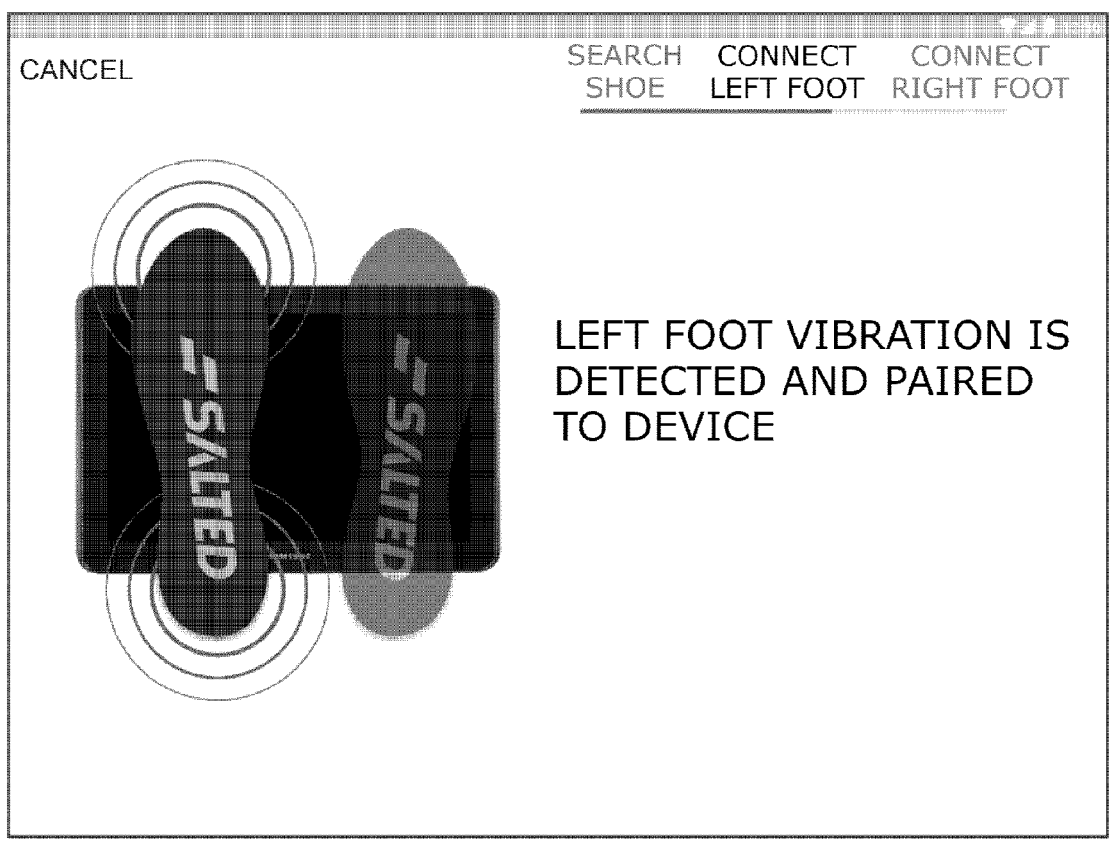
Figure 19:
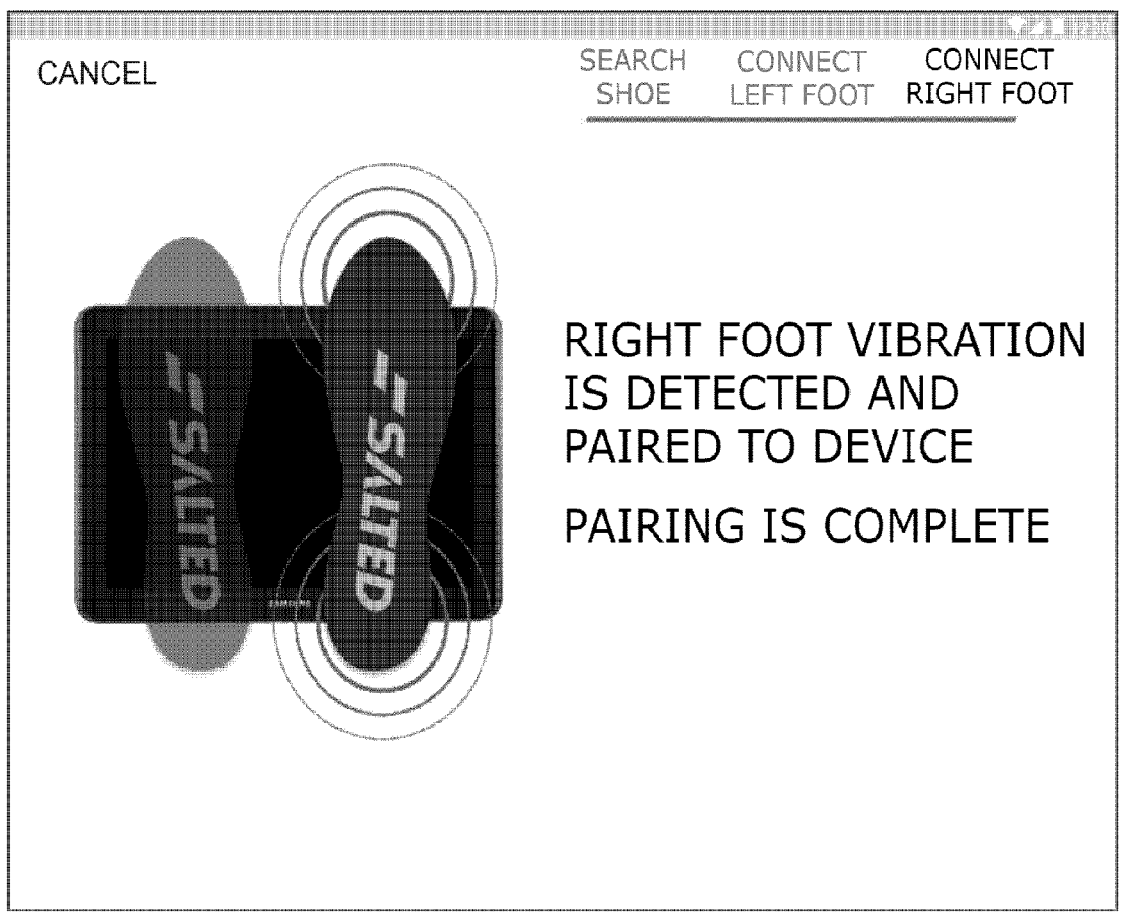

FIG. 16 is a flowchart for describing a method for pairing an insole according to another embodiment of the present invention. FIGS. 18 and 19 are examples of user interfaces for describing a method for pairing an insole according to another embodiment of the present invention.

First, referring to FIG. 16, the user terminal 900 prepares for pairing (S702).

Subsequently, the user terminal 900 scans the insole, in which at least one sensor (i.e., including the sensing system 105) and the tactile element 190 are installed, in the vicinity (S710).

If only 0 or 1 (e.g., left insole) is scanned as a result of the scan, it is regarded that the pairing has failed (S712).

As a result of the scan, a plurality of insoles (L1, L2, L3, L4, R1, R2, R3, R4) may be scanned. For example, as shown in FIG. 12, a first insole (L1, R1), a second insole (L2, R2), a third insole (L3, R3), and a fourth insole (L4, R4) may be located around the user terminal 900 at the first distance (W1), the second distance (W2), the third distance (W3), and the fourth distance (W4), respectively. Here, it may be W1<W2<W3<W4.

Subsequently, each of the left and right ones of the scanned insoles is aligned in the order of distance. That is, since W1<W2<W3<W4, the left insole may be aligned in the order of L1, L2, L3, L4, and the right insole may be aligned in the order of R1, R2, R3, R4.

In other words, the user terminal 900 aligns each of the left and right ones of the scanned insoles in the order of signal strength. The signal strength of the nearest insoles (L1, R1) may be the strongest, and the signal strength of the farthest insoles (L4, R4) may be the weakest.

Figure 17:
FIGS. 17 to 19 are examples of user interfaces (UIs) for describing a method for pairing an insole according to another embodiment of the present invention.

Subsequently, the processor 902 of the user terminal 900 instructs to sequentially vibrate from the tactile element 190 of the insole having a close distance (S720). Here, before the initial vibration instruction is transmitted, the user may put his or her insole on the user terminal 900. Referring to FIG. 17, the user terminal 900 may output a guide screen for placing the user's insole on the user terminal 900.

Subsequently, the user terminal 900 may wait for detection of the vibration (S730).

Specifically, according to the instruction of the user terminal 900, while a plurality of insoles sequentially vibrate in the order of distance (or according to signal strength), the insole placed on the user terminal 900 may vibrate. Since the insole closest to the user terminal 900 vibrates, there is a high possibility that the insole placed on the user terminal 900 vibrates according to the initial vibration instruction. On the other hand, even if the insole placed on the user terminal 900 does not vibrate according to the initial vibration instruction, the insole placed on the user terminal 900 may vibrate according to the sequential vibration instruction.

Subsequently, the user terminal 900 determines whether vibration is detected (S740), and when vibration is detected, the user terminal 900 performs pairing with the corresponding insole (S750).

Meanwhile, the pairing process between the user terminal 900 and the insole may be individually performed for the left insole and the right insole.

Specifically, the tactile element 190 of the nearest left insole (L1) vibrates for, for example, 5 seconds, and it is checked whether the left insole (L1) is the insole to be paired through whether or not the vibration is detected for the corresponding 5 seconds. If no vibration is detected for the corresponding 5 seconds, the tactile element 190 of the second nearest left insole (L2) vibrates for, for example, 5 seconds, and it is checked whether the left insole (L2) is the insole to be paired through whether or not vibration is detected for the corresponding 5 seconds. In this way, a check operation is sequentially attempted for all left insoles (L1, L2, L3, L4) scanned until pairing is established. If the insole to be paired is not found even though the check operation is attempted for all left insoles (L1, L2, L3, L4), the scan operation is performed again.

Referring to FIG. 18, the user terminal 900 may perform a check operation for the left insoles (e.g., L1, L2, L3, L4). At this time, if the left insole (e.g., L1) placed on the user terminal 900 vibrates, the user terminal 900 may detect the vibration. Accordingly, the user terminal 900 may perform pairing with the left insole (L1). When the above-described check operation for the left insole (L1, L2, L3, L4) is completed, the check operation that has been performed for the left insoles (L1, L2, L3, L4) proceeds the same for the right insoles (R1, R2, R3, R4).

Referring to FIG. 19, the user terminal 900 may perform a check operation for the right insoles (R1, R2, R3, R4). At this time, if the right insole placed on the user terminal 900 vibrates, the user terminal 900 may detect the vibration. Accordingly, the user terminal 900 may perform pairing with the right insole.

In summary, the tactile element 190 of the insole (L1) located at the first distance (W1) from the user terminal 900 vibrates for a preset time (e.g., 5 seconds), and the user terminal 900 checks whether the insole (L1) located at the first distance (W1) is the insole to be paired by checking whether or not vibration is detected during the third time period. The third time period may be the same as or longer than a preset time, at which the vibration occurs. If the vibration is not detected within the third time period, the tactile element of the insole (L2) located at a second distance (W2) farther than the first distance (W1) from the user terminal 900 may vibrate for a preset time (for example, 5 seconds). The user terminal 900 may check whether the insole (L2) located at the second distance (W2) is the insole to be paired by checking whether or not vibration is detected during the fourth time period. The process of checking insoles by the user terminal 900 may be repeated/performed for all insoles.

Figure 21:
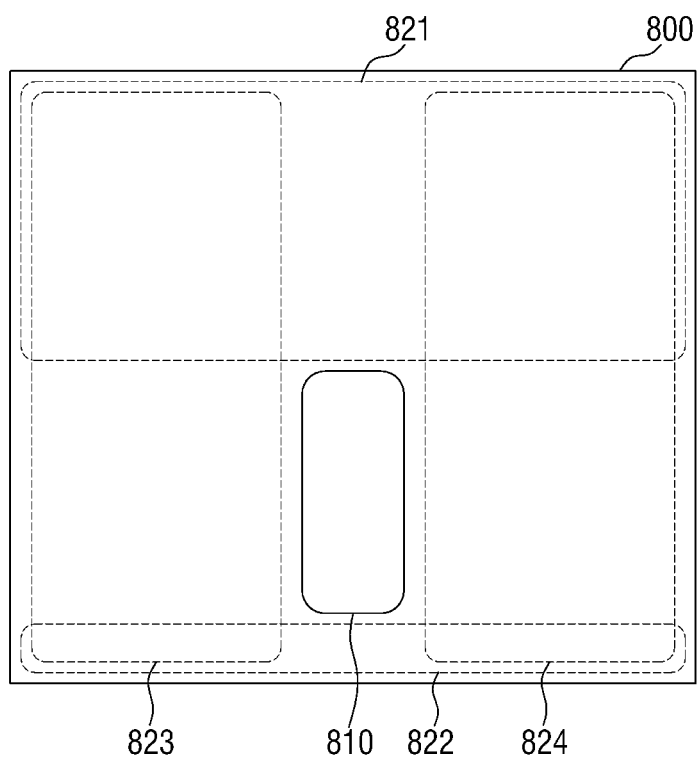
FIG. 21 is a diagram for describing that the weight detecting area shown in FIG. 20 is composed of an exercise reference area and a departure area.
Figure 22A:
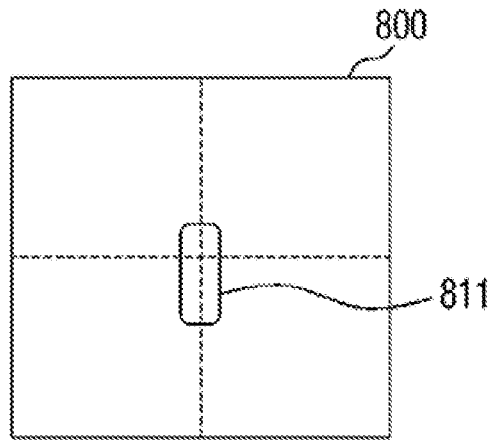
FIG. 22 is a diagram illustrating an exercise reference region according to different exercises displayed in the weight detecting area illustrated in FIG. 20.
Figure 22B:
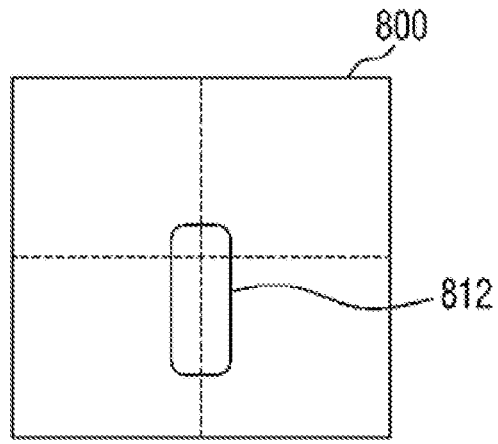
Figure 22C:
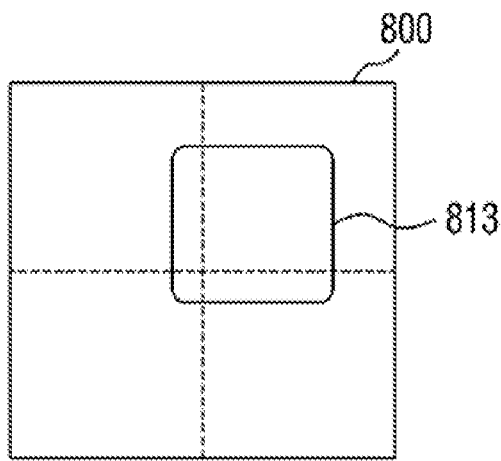
Figure 22D:
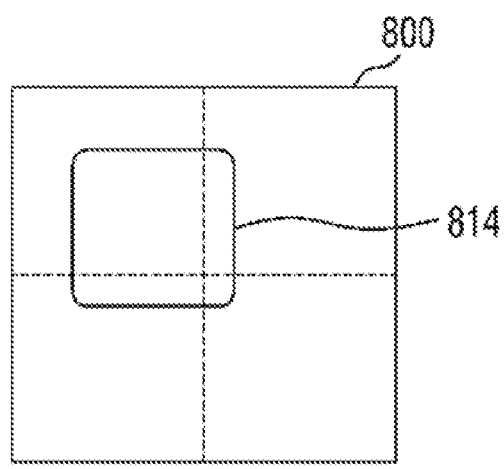

FIG. 20 is a diagram illustrating a weight detection area and an exercise reference area according to some embodiments of the present invention, and FIG. 21 is a diagram for describing that the weight detection area shown in FIG. 20 is composed of an exercise reference area and a departure area. FIG. 22 is a diagram illustrating an exercise reference area according to different exercises displayed in the weight detection area illustrated in FIG. 20.

Referring to FIGS. 20 and 21, the weight detection area 800 may be provided in a rectangular shape. However, the shape of the weight detection area 800 of the present invention is not limited to a rectangle, and may be provided in the form of an ellipse or various polygons. Hereinafter, a description will be made mainly on that the weight detection area 800 is provided in a rectangular shape.

In the present invention, the weight detection area 800 is a virtual area showing the spatial range of the pressure detected by the sensing system 105 installed in the insoles of both shoes while the user is wearing both shoes. In FIG. 20, the first direction (X) indicates a direction parallel to the longitudinal direction of the insole (or the user's front and rear direction), and the second direction (Y) indicates a direction parallel to the user's left and right directions.

As described above, the sensing system 105 may be provided with a plurality of sensors along a line extending from the front to the rear of the insole. Accordingly, a pressure detection range parallel to the first direction (X) may be defined by the sensing system 105 provided in each insole among the insoles of both shoes. Further, a pressure detection range parallel to the second direction (Y) may be defined by the sensing system 105 provided in the insole of both shoes.

The weight detection area 800 may be understood as representing a two-dimensional area that can be defined through pressure detection by the sensing system 105 provided in the insoles of both shoes.

The weight detection area 800 may include an exercise reference area 810 and a departure area 821, 822, 823, and 824. The exercise reference area 810 is a part of the weight detection area 800 and indicates an area set for each type of exercise selected by the user. When the user performs a specific exercise, it may be determined whether the exercise is being performed in a correct posture through the center of gravity of the body. The exercise reference area 810 may serve as a criterion for determining whether an exercise is being performed in a correct posture. For example, when the user's center of gravity is included in the exercise reference area 810, it may be determined that the user performs the exercise in a correct posture.

The departure areas 821, 822, 823, 824 are areas not occupied by the exercise reference area 810 among the weight detection areas 800 and may serve as a criterion for determining whether an exercise is being performed in an incorrect posture. For example, when the user's center of gravity is outside the exercise reference area 810, it may be determined that the user performs the exercise in an incorrect posture.

The departure areas 821, 822, 823, and 824 may include a front departure area 821, a rear departure area 822, a left departure area 823, and a right departure area 824. An overlapping area may be included between adjacent departure areas 821, 822, 823, and 824. For example, the front departure area 821 may be overlapped at the upper end of the left departure area 823 and the right departure area 824, and the rear departure area 822 may be overlapped at the lower end.

The size and position of the exercise reference area 810 on the weight detection area 800 may vary according to the type of exercise. Referring to FIG. 22, (a) represents an exercise reference area 811 corresponding to standing in place, (b) represents an exercise reference area 812 corresponding to squat, (c) represents an exercise reference area 813 corresponding to left foot lunge, and (d) represents an exercise reference area 814 corresponding to right foot lunge.

In the case of the exercise of standing in place, the exercise reference area 811 having a relatively small size may be arranged at the center of the weight detection area 800 as shown in (a). In the case of the squat exercise, the exercise reference area 812 having a relatively large size may be arranged at the center of the weight detecting area 800 as shown in (b). In the case of the left foot lunge exercise, a relatively large exercise reference area 813 may be arranged in the upper right of the weight detection area 800 as shown in (c). This is because a large load is applied to the front part of the right foot. Likewise, in the case of the right foot lunge exercise, a relatively large exercise reference area 814 may be arranged in the upper left of the weight detection area 800 as shown in (d). This is because a large load is applied to the front part of the left foot.

Figure 23:
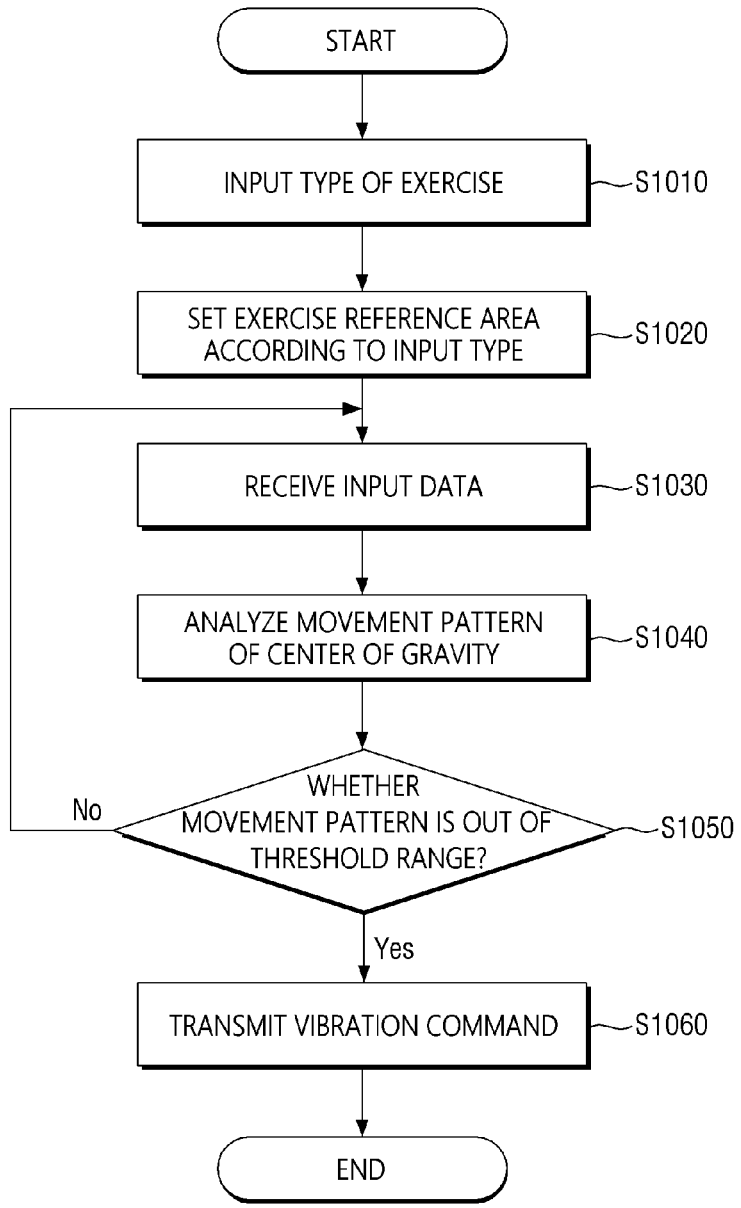
FIG. 23 is a flowchart for describing an exercise feedback method according to some embodiments of the present invention.
Figure 25:
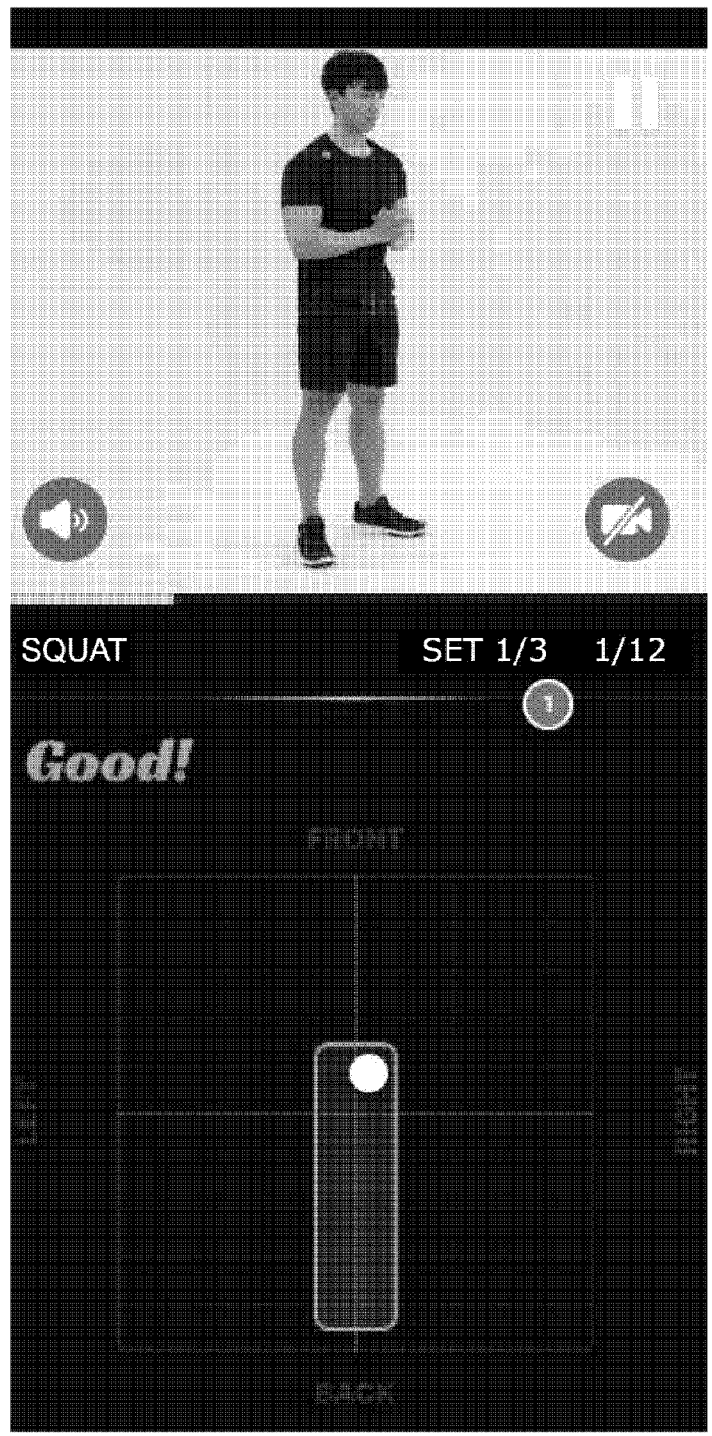
FIG. 25 is an example of a user interface (UI) for describing an exercise feedback method according to some embodiments of the present invention.

FIG. 23 is a flowchart for describing an exercise feedback method according to some embodiments of the present invention, FIG. 24 is a diagram for describing a vibration pattern for each type of vibration command shown in FIG. 23, and FIG. 25 is an example of a user interface (UI) for describing an exercise feedback method according to some embodiments of the present invention.

Referring to FIG. 23, the user terminal 900 may receive an input of the type of exercise (S1010). For example, an exercise such as standing in place, squat, or lunge may be input. The type of exercise may be input through the input module 901.

The user terminal 900 may set the exercise reference area 810 according to the type input to the weight detection area 800 (S1020). For example, the user terminal 900 may set the exercise reference area 811 as shown in (a) of FIG. 22 when the standing in place is input as the type of exercise, set the exercise reference area 812 as shown in (b) of FIG. 22 when the squat is input as the type of exercise, and set exercise reference areas 813 and 814 as shown in (c) or (d) of FIG. 22 when the lunge is input as the type of exercise.

Subsequently, as the user proceeds to exercise while wearing shoes, the user terminal 900 may receive pressure data (S1030). The pressure data may be received from the sensing system 105 provided in the insole of the shoe.

With reference to the received pressure data, the user terminal 900 may analyze the movement pattern of the center of gravity (S1040). And, according to the analysis result, the user terminal 900 may determine whether the user's movement pattern is out of a threshold range (S1050). The user terminal 900 may determine that the movement pattern is out of the threshold range when the user's center of gravity is out of the exercise reference area 810.

Alternatively, the user terminal 900 may determine whether the movement pattern is out of a threshold range by referring to the ratio of the user's center of gravity out of the exercise reference area 810. For example, the user terminal 900 may consider a time when the center of gravity is located in the exercise reference area 810 and a time when the center of gravity is out of the exercise reference area 810 (time included in departure areas 821, 822, 823, 824) for one exercise motion. For example, if the time included in the exercise reference area 810 is greater than the time included in the departure areas 821, 822, 823, 824, the user terminal 900 determines that the movement pattern is included in the threshold range. Conversely, when the time included in the exercise reference area 810 is less than the time included in the departure areas 821, 822, 823, 824, the user terminal 900 may determine that the movement pattern is out of the threshold range.

Meanwhile, the time outside the exercise reference area 810 (the time included in the departure areas 821, 822, 823, 824) may also be analyzed in detail.

For example, among the times when the user's center of gravity is located in the departure areas 821, 822, 823, 824, if the time located in the departure areas 823 and 824 is greater than the time located in the departure areas 821 and 822, it can be determined that the user is shaking in the left and right direction.

Alternatively, among the times when the user's center of gravity is located in the departure areas 821, 822, 823, 824, if the time located in the departure areas 821, 822 is greater than the time located in the departure areas 823, 824, it can be determined that the user is shaking in the front and rear directions.

Further, out of the total exercise time, the time when the user's center of gravity is located in the departure areas 823 and 824 may be calculated to calculate the left and right departure rate.

Likewise, out of the total exercise time, the time when the user's center of gravity is located in the departure areas 821 and 822 may be calculated to calculate the front and rear departure rate.

Meanwhile, the time located in each area 810, 821, 822, 823, 824 may be calculated by the number of frames. For example, assuming that the insole transmits the user's center of gravity position to the user terminal 900 every 5 ms, 1000 positions may be transmitted during the total exercise time of 5000 ms. Accordingly, out of 1000, 500 may be in the exercise reference area 810, 400 may be in the departure areas 823 and 824, and 100 may be in the departure areas 821 and 822. The left and right departure rate may be (400/1000)×100=40%, and the front and rear departure rate may be (100/1000)×100=10%.

When the movement pattern is out of the threshold range, the user terminal 900 may transmit a vibration command to the sensing system 105 (S1060). Accordingly, the tactile element of the sensing system 105 generates vibration, and the user can recognize that his or her posture is incorrect by referring to the vibration generated from the insole of the shoe he or she is wearing. Meanwhile, when the movement pattern does not exceed the threshold range, the user terminal 900 may continuously receive pressure data and analyze the movement pattern of the center of gravity.

The vibration command may include a vibration pattern. Referring to FIG. 24, different vibration patterns may be provided according to a result of analyzing the user's exercise.

The user terminal 900 may transmit a vibration command so that the insole of the left shoe vibrates briefly when the user's posture is skewed to the left, the insole of the right shoe vibrates briefly when the user's posture is skewed to the right, and the insoles of both shoes vibrate briefly when the user's posture shakes left and right. Alternatively, the user terminal 900 may transmit a vibration commend so that the insoles of both shoes intermittently vibrates at short intervals for a certain time when the user's posture is skewed to rear, the insoles of both shoes intermittently vibrates at long intervals for a certain time when the user's posture is skewed to front, and the insoles of both shoes continuously vibrates for a certain time when the user's posture shakes back and forth.

Meanwhile, the vibration pattern according to the exercise analysis shown in FIG. 24 is exemplary, and various vibration patterns according to the more various exercise analysis may be provided.

In addition, the deviation of the user's center of gravity in the left and right directions, that is, the left and right motion deviation may be calculated. The average of the user's center of gravity in the left and right directions may be calculated.

Likewise, the deviation of the user's center of gravity in the front and rear directions, that is, the front and rear motion deviation may be calculated. The average of the user's center of gravity in the front and rear directions also may be calculated.

Various analysis data may be calculated by using the obtained user's center of gravity information.

Referring to FIG. 25, the user terminal 900 may output information on an ongoing exercise to the user.

For example, the user terminal 900 may output the type of exercise, the posture of the exercise, the number of sets, and the number of motions in text, pictures, or videos. Further, the user terminal 900 may output information on the user's exercise posture. To this end, the user terminal 900 may output the weight detection area 800 and the exercise reference area 810, and display the user's center of gravity detected by the insole in the weight detection area 800. The user may correct his or her posture through not only the vibration provided by the insole, but also information about the exercise posture output through the user terminal 900.

Further, the user terminal 900 may output an analysis synthesis result of the user's exercise posture. The analysis synthesis result may be output in the form of texts such as, for example, "Great," "Good," "Bad" and "Very Bad." Users can easily check their posture by referring to the analysis synthesis result.

For example, the analysis synthesis result may be calculated using at least one of the above-described left and right departure rate, front and rear departure rate, left and right motion deviation, left and right motion average, front and rear motion deviation, and front and rear motion average.

For example, if the above-described left and right departure rate is 10% or less and the front and rear motion deviation falls within the range of 6 to 20%, it can be evaluated as "Great."

Further, if the left and right departure rate is 50% or more and the front and rear motion deviation is 20% or more, it can be evaluated as "Very Bad."

Although the embodiments of the present invention have been described with reference to the above and the accompanying drawings, those of ordinary skill in the art to which the present invention pertains can understand that the present invention may be implemented in other specific forms without changing the technical spirit or essential features. Therefore, it should be understood that the embodiments described above are illustrative and non-limiting in all respects.

What is claimed is:

1. A method for pairing an insole comprising:
scanning a plurality of insoles, each of which comprises at least one pressure sensor and at least one tactile element; and
paring one insole of the plurality of insoles with a user terminal by performing:
providing, to a first insole of the plurality of insoles, a first vibration command having a first signal strength, and
providing, to a second insole of the plurality of insoles, a second vibration command having a second signal strength less than the first signal strength when the first insole and the user terminal are not paired during a first time period.

2. The method of claim 1,
wherein the at least one tactile element comprises a vibration motor, and the user terminal comprises a vibration detection sensor, and wherein the method further comprises:
paring a third insole of the plurality of insoles with the user terminal by performing:
providing a third vibration command to the third insole to vibrate the vibration motor of the third insole;
positioning the third insole to be in contact with the user terminal; and
when vibration by the vibration motor of the third insole in contact with the user terminal is detected by the vibration detection sensor, pairing the third insole and the user terminal.

3. The method of claim 2,
wherein the vibration detection sensor is an acceleration sensor.

4. The method of claim 1,
wherein each of the plurality of insoles comprises:
a lower plate;
the at least one pressure sensor installed on the lower plate;
a control module installed on the lower plate and electrically connected to the at least one pressure sensor;
the at least one tactile element connected to the control module; and
an upper plate covering the lower plate, the at least one pressure sensor, the control module, and the at least one tactile element.

5. The method of claim 4,
wherein a thickness of a rear foot area of the upper plate is thicker than a thickness of a fore foot area of the upper plate.

6. The method of claim 5,
wherein the control module is arranged in an arch area of a respective insole of the plurality of insoles,
wherein the at least one tactile element is arranged to be biased toward a foot blade of a foot within the arch area.

7. The method of claim 4,
wherein the control module is arranged in an arch area of a respective insole of the plurality of insoles,
wherein the at least one tactile element is arranged to be biased toward a foot blade of a foot within the arch area.

8. The method of claim 1, further comprising:
selecting a type of exercise to perform;
receiving pressure data from the paired insole comprising the at least one pressure sensor and the at least one tactile element including a vibration motor, while the selected exercise is being performed;
calculating a center of gravity based on the received pressure data;
checking whether the center of gravity is positioned within an exercise reference area corresponding to the selected exercise to determine whether the selected exercise is being performed in a correct posture; and
providing a vibration command to the insole, in order to indicate whether the selected exercise is being performed in the correct posture.

9. The method of claim 8,
wherein the paired insole includes a left insole and a right insole,
wherein the providing comprises providing the vibration command to at least one of the left insole and the right insole.

10. The method of claim 8,
wherein the vibration command includes a command to generate a vibration of a preset pattern.

11. The method of claim 10,
wherein the vibration command is determined in consideration of a time when the calculated center of gravity is located in the exercise reference area and a time when the calculated center of gravity is outside the exercise reference area while the selected exercise is in progress.

12. The method of claim 8,
wherein a weight detection area capable of detecting a center of gravity by the paired insole is set,
wherein the exercise reference area is a part of the weight detection area and includes an area set for each type of the exercise.

\* \* \* \* \*